United States Patent
Kaneko

(10) Patent No.: US 9,966,043 B2
(45) Date of Patent: May 8, 2018

(54) IDENTIFIER CONTROL DEVICE, IDENTIFIER CONTROL SYSTEM, MULTI-SCREEN DISPLAY SYSTEM, IDENTIFIER CONTROLMETHOD, AND PROGRAM

(71) Applicant: Yasunobu Kaneko, Tokyo (JP)

(72) Inventor: Yasunobu Kaneko, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 402 days.

(21) Appl. No.: 14/437,478

(22) PCT Filed: Oct. 26, 2012

(86) PCT No.: PCT/JP2012/077677
§ 371 (c)(1),
(2) Date: Apr. 21, 2015

(87) PCT Pub. No.: WO2014/064824
PCT Pub. Date: May 1, 2014

(65) Prior Publication Data
US 2015/0287390 A1     Oct. 8, 2015

(51) Int. Cl.
*H04L 29/08*     (2006.01)
*G09G 5/12*     (2006.01)
(Continued)

(52) U.S. Cl.
CPC .............. *G09G 5/12* (2013.01); *G06F 3/1431* (2013.01); *G06F 3/1446* (2013.01);
(Continued)

(58) Field of Classification Search
CPC ........ H04L 67/10; G09G 5/12; H04N 7/0145; G06T 15/00; G06T 1/60
(Continued)

(56) References Cited

U.S. PATENT DOCUMENTS 7,525,549 B1 *    4/2009  Diard ................. G06T 1/20
                                                      345/440
2003/0210347 A1 * 11/2003  Kondo ............... H04N 7/0145
                                                      348/383
(Continued)

FOREIGN PATENT DOCUMENTS

JP     2005-157826 A    6/2005
JP     2009-301290 A   12/2009
(Continued)

OTHER PUBLICATIONS

International Search Report (ISR) (PCT Form PCT/ISA/210), in PCT/JP2012/077677, dated Jan. 29, 2013.

*Primary Examiner* — Ranodhi Serrao
*Assistant Examiner* — James Fiorillo
(74) *Attorney, Agent, or Firm* — McGinn IP Law Group, PLLC

(57) ABSTRACT

An identifier control device includes: a cumulative transmission and reception initiation control unit that instructs a plurality of controlled devices, via a network, to initiate cumulative transmission and reception; a distance determination command transmission unit that transmits to each of the plurality of controlled devices via the network a distance determination command; a distance recognition unit that determines the distances on the network with respect to the respective plurality of controlled devices, based on response signals transmitted by the respective plurality of controlled devices after the accumulation time has elapsed from when each of the plurality of controlled devices receives the distance determination command; and an identifier control unit that sets to each of the plurality of controlled devices, via the network, an identifier for each of the plurality of controlled devices determined based on the determined distances on the network.

11 Claims, 16 Drawing Sheets

(51) Int. Cl.
*H04L 29/12* (2006.01)
*G06F 3/14* (2006.01)

(52) U.S. Cl.
CPC .......... *H04L 61/2038* (2013.01); *H04L 67/10* (2013.01); *G09G 2356/00* (2013.01); *G09G 2370/02* (2013.01); *G09G 2370/025* (2013.01)

(58) Field of Classification Search
USPC ....................... 709/249; 348/383; 345/557, 1
See application file for complete search history.

(56) References Cited

U.S. PATENT DOCUMENTS

| | | | | |
|---|---|---|---|---|
| 2004/0203874 A1* | 10/2004 | Brandt | ............... | G05B 19/4183 455/456.1 |
| 2007/0300190 A1* | 12/2007 | Bier | ...................... | G06F 17/278 715/862 |
| 2008/0079954 A1* | 4/2008 | Iwaki | ....................... | G01C 3/08 356/614 |
| 2008/0303746 A1* | 12/2008 | Schlottmann | ........... | G07F 17/32 345/1.2 |
| 2009/0096726 A1* | 4/2009 | Uehara | .............. | G02B 27/2214 345/84 |
| 2009/0243958 A1* | 10/2009 | Matsumoto | ........... | G06F 3/1423 345/1.1 |
| 2010/0033549 A1* | 2/2010 | Sato | ...................... | G06F 3/0346 348/14.08 |
| 2010/0061396 A1* | 3/2010 | Andersson | ............. | H01R 31/02 370/463 |
| 2010/0321410 A1* | 12/2010 | Jenks | ................... | G06F 3/1446 345/676 |
| 2012/0218180 A1* | 8/2012 | Ootsuka | ................... | G09G 5/00 345/156 |
| 2012/0294171 A1* | 11/2012 | Ugai | .................... | H04L 49/1576 370/252 |
| 2013/0061271 A1* | 3/2013 | Lu | ........................ | H04L 12/2838 725/74 |
| 2013/0215131 A1* | 8/2013 | Sato | .......................... | G06T 1/60 345/557 |
| 2013/0260360 A1* | 10/2013 | Baurmann | ................ | G06F 3/14 434/365 |
| 2014/0089823 A1* | 3/2014 | Kang | ................... | G06F 3/04847 715/761 |
| 2014/0125697 A1* | 5/2014 | Suito | ..................... | G06F 3/0488 345/629 |
| 2014/0222891 A1* | 8/2014 | Ko | ...................... | H04L 67/1097 709/203 |
| 2014/0244447 A1* | 8/2014 | Kim | ................... | G06Q 30/0643 705/27.2 |
| 2014/0278088 A1* | 9/2014 | Matsuo | ................ | G09B 29/005 701/532 |
| 2014/0307085 A1* | 10/2014 | Ohsawa | ................ | G01B 11/026 348/136 |
| 2014/0333532 A1* | 11/2014 | Ohbitsu | .............. | H04N 13/0022 345/156 |
| 2015/0205565 A1* | 7/2015 | Koguchi | ............... | G06F 3/1446 345/1.3 |
| 2015/0338911 A1* | 11/2015 | Yamamoto | ............ | H04L 69/323 713/323 |
| 2016/0163018 A1* | 6/2016 | Wang | ....................... | G06T 1/20 345/504 |
| 2017/0192733 A1* | 7/2017 | Huang | .................. | G06F 3/1446 |

FOREIGN PATENT DOCUMENTS

| | | |
|---|---|---|
| JP | 2011-244356 A | 12/2011 |
| JP | 2012-088433 A | 5/2012 |
| JP | 2012-123085 A | 6/2012 |

* cited by examiner

IDENTIFIER CONTROL DEVICE, IDENTIFIER CONTROL SYSTEM, MULTI-SCREEN DISPLAY SYSTEM, IDENTIFIER CONTROLMETHOD, AND PROGRAM

TECHNICAL FIELD

The present invention relates to an identifier control device, an identifier control system, a display system, an identifier control method, and a program.

BACKGROUND ART

A multi-screen display system is known in which, by arranging the screens of a plurality of display devices along a planar direction and displaying a single image such that it is divided between the screens of each of the plurality of display devices, a single image is displayed on a large screen formed by the arrangement of the screens of the plurality of display devices.

The following is known as such a multi-screen display system. That is to say, this multi-screen display system includes a plurality of display devices that are connected by the daisy chain method by cables conforming to RS232C (Recommended Standard 232 version C). In addition, the multi-screen display system automatically sets, by means of a predetermined algorithm, a set identifier for each of the plurality of display devices according to the connection sequence in the daisy chain (refer to Patent Document 1 for example).

PRIOR ART DOCUMENTS

Patent Document

[Patent Document 1] Japanese Unexamined Patent Application, First Publication No. 2012-88433

SUMMARY OF THE INVENTION

Problem to be Solved by the Invention

With respect to the communication between the plurality of display devices in a multi-screen display system of the manner described above, connection by means of a network such as a LAN (Local Area Network) in place of RS232C can be considered for example. As a result of connecting the plurality of display devices over a network in this manner, it becomes possible to achieve high-speed and multifunctional communication for example.

Furthermore, when the plurality of display device is connected over a network, it is also possible to connect the plurality of display devices by daisy chaining as for the case of RS232C. Consequently, it is possible to make the cables that connect the intervals between the plurality of display devices short and organized.

Here, in a case where the plurality of display devices are connected by means of a network, an IP (Internet Protocol) address, a MAC (Media Access Control) address, and the like, is assigned to each of the plurality of display devices. However, even in a configuration in which the plurality of display devices are connected by means of a network, it is preferable to set an identifiers for uniquely identifying the display devices in the multi-screen display system in order to perform display control of each of the display devices for example.

However, in a case where the network is formed by connecting the plurality of display devices by daisy chaining, a communication procedure conforming to RS232C is not executed despite being connected in the same way by daisy chaining, since the communication procedure thereof conforms to a network protocol. Consequently, it becomes difficult to automatically set an identifier to each of the display devices in the connection sequence of the daisy chain in the manner of Patent Document 1 for example.

The present invention takes into consideration such circumstances, with an object of making the identifier of each of the devices, in a case where the network is formed by connecting a plurality of devices by daisy chaining, automatically settable according to the connection sequence of the daisy chain.

Means for Solving the Problem

An identifier control device as one exemplary aspect of the present invention includes: a cumulative transmission and reception initiation control unit that instructs a plurality of controlled devices, via a network formed by connecting the plurality of controlled devices by daisy chaining, to initiate cumulative transmission and reception in which, after received data is temporarily accumulated over a predetermined accumulation time, data transmission is performed in response to the received data; a distance determination command transmission unit that transmits to each of the plurality of controlled devices via the network a distance determination command for determining distances on the network with respect to the respective plurality of controlled devices, after initiation of the cumulative transmission and reception is instructed by the cumulative transmission and reception initiation control unit; a distance recognition unit that determines the distances on the network with respect to the respective plurality of controlled devices, based on response signals with respect to the distance determination command, the response signals being transmitted by the respective plurality of controlled devices after the accumulation time has elapsed from when each of the plurality of controlled devices receives the distance determination command; and an identifier control unit that sets to each of the plurality of controlled devices, via the network, an identifier for each of the plurality of controlled devices determined based on the distances on the network with respect to the respective plurality of controlled devices recognized by the distance recognition unit.

An identifier control system as one exemplary aspect of the present invention is an identifier control system in which an identifier control device in a first position, and a plurality of controlled devices in a second position onwards, are connected by a network formed by daisy chaining, the identifier control device includes: a cumulative transmission and reception initiation control unit that instructs the plurality of controlled devices, via the network, to initiate cumulative transmission and reception in which, after received data is temporarily accumulated over a predetermined accumulation time, data transmission is performed in response to the received data; a distance determination command transmission unit that transmits to each of the plurality of controlled devices via the network a distance determination command for determining distances on the network with respect to the respective plurality of controlled devices, after initiation of the cumulative transmission and reception is instructed by the cumulative transmission and reception initiation control unit; a distance recognition unit that determines the distances on the network with respect to the respective plurality of controlled devices, based on response signals with respect to the distance determination command, the response signals being transmitted by the respective plurality of controlled devices after the accumulation time has elapsed from when each of the plurality of controlled devices receives the distance determination command; and an identifier control unit that sets to each of the plurality of controlled devices, via the network, an identifier for each of the plurality of controlled devices determined based on the distances on the network with respect to the respective plurality of controlled devices recognized by the distance recognition unit, and the controlled device includes: a data transmission and reception unit that, after the accumulation time has elapsed from reception of the distance determination command, transmits to the identifier control device via the network a response signal with respect to the distance determination command and transmits the received distance determination command via the network to a controlled device in a following position, in a case of receiving the distance determination command as received data after being instructed to initiate the cumulative transmission and reception by the cumulative transmission and reception initiation control unit; and an identifier setting unit that sets an identifier in compliance with a control by the identifier control unit.

A multi-screen display system as one exemplary aspect of the present invention is a multi-screen display system in which a screen of a master display device and screens of a plurality of slave display devices are arranged in a predetermined arrangement pattern, and the master display device in a first position, and a plurality of slave display devices in a second position onwards, are connected by a network formed by daisy chaining, the master display device includes: a cumulative transmission and reception initiation control unit that instructs the plurality of slave display devices, via the network, to initiate cumulative transmission and reception in which, after received data is temporarily accumulated over a predetermined accumulation time, data transmission is performed in response to the received data; a distance determination command transmission unit that transmits to each of the plurality of slave display devices via the network a distance determination command for determining distances on the network with respect to the respective plurality of slave display devices, after initiation of the cumulative transmission and reception is instructed by the cumulative transmission and reception initiation control unit; a distance recognition unit that determines the distances on the network with respect to the respective plurality of slave display devices, based on response signals with respect to the distance determination command, the response signals being transmitted by the respective plurality of slave display devices after the accumulation time has elapsed from when each of the plurality of slave display devices receives the distance determination command; and an identifier control unit that sets to each of the plurality of slave display devices, via the network, an identifier for each of the plurality of slave display devices determined based on the distances on the network with respect to the respective plurality of slave display devices recognized by the distance recognition unit, and the slave display device includes: a data transmission and reception unit that, after the accumulation time has elapsed from reception of the distance determination command, transmits to the master display device via the network a response signal with respect to the distance determination command and transmits the received distance determination command via the network to a slave display device in a following position, in a case of receiving the distance determination command as received data after being instructed to initiate the cumulative transmission and reception by the cumulative transmission and reception initiation control unit; and an identifier setting unit that sets an identifier in compliance with a control by the identifier control unit.

An identifier control method as one exemplary aspect of the present invention includes: a cumulative transmission and reception initiation control step of instructing a plurality of controlled devices, via a network formed by connecting the plurality of controlled devices by daisy chaining, to initiate cumulative transmission and reception in which, after received data is temporarily accumulated over a predetermined accumulation time, data transmission is performed in response to the received data; a distance determination command transmission step of transmitting to each of the plurality of controlled devices via the network a distance determination command for determining distances on the network with respect to the respective plurality of controlled devices, after initiation of the cumulative transmission and reception is instructed in the cumulative transmission and reception initiation control step; a distance recognition step of determining the distances on the network with respect to the respective plurality of controlled devices, based on response signals with respect to the distance determination command, the response signals being transmitted by the respective plurality of controlled devices after the accumulation time has elapsed from when each of the plurality of controlled devices receive the distance determination command; and an identifier control step of setting to each of the plurality of controlled devices, via the network, an identifier for each of the plurality of controlled devices determined based on the distances on the network with respect to the respective plurality of controlled devices recognized in the distance recognition step.

A program as one exemplary aspect of the present invention causes a computer to execute: a cumulative transmission and reception initiation control step of instructing a plurality of controlled devices, via a network formed by connecting the plurality of controlled devices by daisy chaining, to initiate cumulative transmission and reception in which, after received data is temporarily accumulated over a predetermined accumulation time, data transmission is performed in response to the received data; a distance determination command transmission step of transmitting to each of the plurality of controlled devices via the network a distance determination command for determining distances on the network with respect to the respective plurality of controlled devices, after initiation of the cumulative transmission and reception is instructed in the cumulative transmission and reception initiation control step; a distance recognition step of determining the distances on the network with respect to the respective plurality of controlled devices, based on response signals with respect to the distance determination command, the response signals being transmitted by the respective plurality of controlled devices after the accumulation time has elapsed from when each of the plurality of controlled devices receive the distance determination command; and an identifier control step of setting to each of the plurality of controlled devices, via the network, an identifier for each of the plurality of controlled devices determined based on the distances on the network with respect to the respective plurality of controlled devices recognized in the distance recognition step.

Effect of the Invention

According to the present invention, in a case where a network is formed by connecting a plurality of devices by daisy chaining, an effect is obtained in which the identifier of each device becomes automatically settable according to the connection sequence of the daisy chain.

EMBODIMENTS FOR CARRYING OUT THE INVENTION

First Exemplary Embodiment

[Configuration Example of Multi-Screen Display System]

Figure 1:
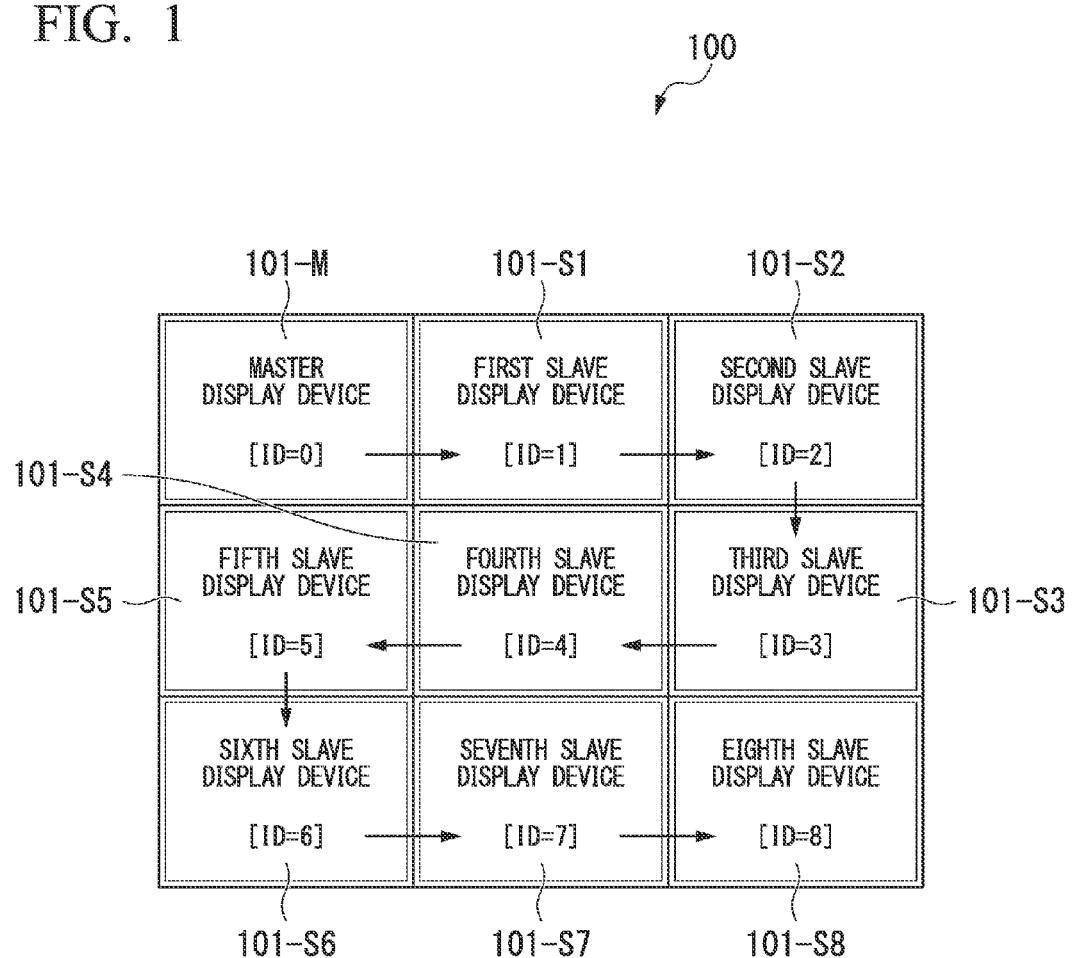
FIG. 1 is a diagram showing an arrangement example of display devices in a multi-screen display system of a first exemplary embodiment.

FIG. 1 represents an arrangement example of display devices in a multi-screen display system 100 of a first exemplary embodiment of the present invention.

The multi-screen display system 100 of the present exemplary embodiment includes, as shown in the figure, a single master display device 101-M, and eight of first slave display device 101-S1 to an eighth slave display device 101-S8, giving a total of nine display devices.

If it is not particularly necessary to distinguish between the first slave display device 101-S1 to the eighth slave display device 101-S8, then they are denoted as "slave display devices 101-S". Furthermore, if it is not particularly necessary to distinguish between the master display device 101-M and the slave display devices 101-S, then they are denoted as "display devices 101".

The hardware configuration of the master display device 101-M and the slave display devices 101-S may be the same. For example, the display device 101 that functions as the master display device 101-M, and the display devices 101 that function as the slave display devices 101-S, may be respectively set by control from an external host, and the like, or according to a user operation performed with respect to the display devices 101.

The master display device 101-M may also be referred to as an "identifier control device". Furthermore, the slave display devices 101-S may also be referred to as "controlled devices".

FIG. 1 represents an example in which a total of nine display devices 101 are arranged in 3 rows×3 columns. In this arrangement, the master display device 101-M is positioned in the left (first column) of the first row, the first slave display device 101-S1 is positioned in the center (second column) of the first row, and the second slave display device 101-S2 is positioned in the right (third column) of the first row.

In the second row, the third slave display device 101-S3 is positioned on the right, the fourth slave display device 101-S4 is positioned in the center, and the fifth slave display device 101-S5 is positioned on the left.

In the third row, the sixth slave display device 101-S6 is positioned on the left, the seventh slave display device 101-S7 is positioned in the center, and the eighth slave display device 101-S8 is positioned on the right.

As a result of the nine display devices 101 being arranged in this manner, a single large display is formed by the screens of the nine display devices 101.

The nine display devices 101 are connected such that they are able to communicate via a network. Here, the network represents a LAN such as an Ethernet (registered trademark) for example. Furthermore, the nine display devices 101 are connected by daisy chaining Daisy chaining is a wiring method that sequentially connects in series a plurality of devices (here, the display devices 101) over a network.

Here, the connection sequence of the daisy chain is such that, as indicated by the arrows in FIG. 1, the master display device 101-M positioned in the left of the first row is in the first position. Next, the first slave display device 101-S1, positioned adjacently to the right of the master display device 101-M, is connected in the second position. The second slave display device 101-S2, positioned adjacently to the right of the first slave display device 101-S1, is connected in the third position.

The third slave display device 101-S3, positioned in the right of the second row and adjacently below the second slave display device 101-S2, is connected in the fourth position. The fourth slave display device 101-S4, positioned adjacently to the left of the third slave display device 101-S3, is connected in the fifth position. The fifth slave display device 101-S5, positioned adjacently to the left of the fourth slave display device 101-S4, is connected in the sixth position.

The sixth slave display device 101-S6, positioned in the left of the third row and adjacently below the fifth slave display device 101-S5, is connected in the seventh position. The seventh slave display device 101-S7, positioned adjacently to the right of the sixth slave display device 101-S6, is connected in the eighth position. The eighth slave display device 101-S8, positioned adjacently to the right of the seventh slave display device 101-S7, is connected in the ninth position.

In this manner, in the example of FIG. 1, a network is formed by daisy chaining by mutually connecting the display devices 101 with those that are adjacent above or below, or on the left or right. Consequently, for example, the length of the cables used for connecting between the display devices 101 to form the network can be made shorter.

The master display device 101-M receives an image signal to be displayed by the multi-screen display system 100 from an external source via the network for example, and transfers it to the slave display devices 101-S in the following positions in the daisy chain. Therefore, the master display device 101-M transmits the received image signal to the first slave display device 101-S1, which is in the next position.

The first slave display device 101-S1 transmits the received image signal to the second slave display device 101-S2, which is in the following position. Thereafter, in the same manner, the second slave display device 101-S2 to the seventh slave display device 101-S7 transmit the image signal received from the previous position to the following position.

In this manner, the image signal supplied to the master display device 101-M is sequentially transferred to the first slave display device 101-S1 to the eighth slave display device 101-S8. Consequently, the master display device 101-M and the first slave display device 101-S1 to the eighth slave display device 101-S8 are respectively able to receive the same image signal.

Further, the master display device 101-M and the first slave display device 101-S1 to the eighth slave display device 101-S8 respectively form nine partial images in which the image of the received image signal is divided into 3 rows×3 columns. The master display device 101-M and the first slave display device 101-S1 to the eighth slave display device 101-S8 select and display on the screen the partial image corresponding to its own arrangement position. Consequently, a single image is displayed enlarged, in which the nine screens of the master display device 101-M and the first slave display device 101-S1 to the eighth slave display device 101-S8 act as a single screen.

Furthermore, the master display device 101-M respectively sets with respect to the first slave display device 101-S1 to the eighth slave display device 101-S, a display device ID. The display device ID is also referred to as an identifier. The display device ID is for uniquely identifying the display devices 101.

In FIG. 1, an example is shown in which the master display device 101-M has respectively set with respect to the first slave display device 101-S1 to the eighth slave display device 101-S8, display device IDs of "1" to "8".

The master display device 101-M may, as necessary, set a display device ID to itself other than "1" to "8" for example. In the example of FIG. 1, an example is shown in which the master display device 101-M has set to itself a display device ID of "0".

[Configuration Example of Master Display Device]

Figure 2:
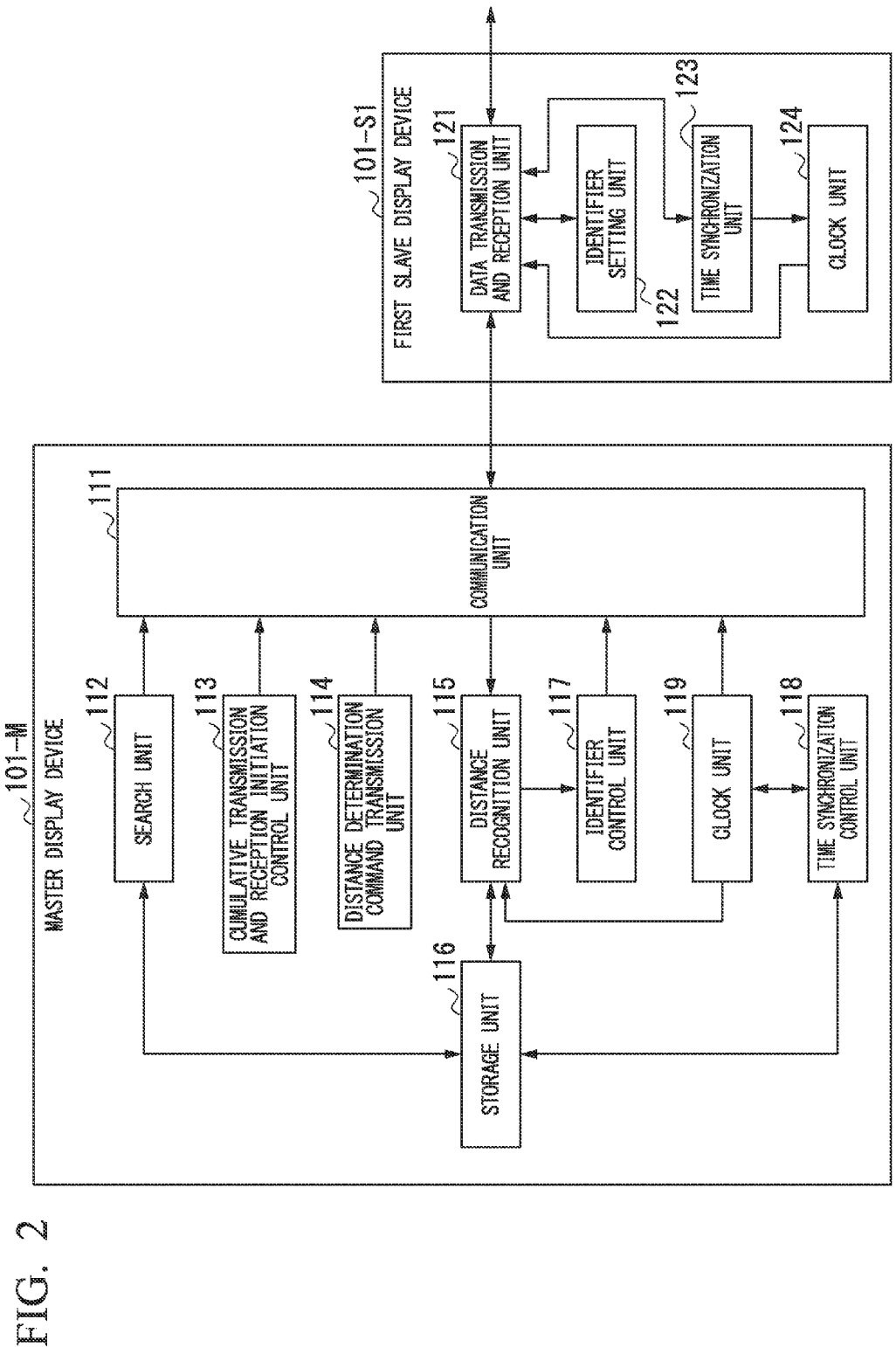
FIG. 2 is a diagram showing a configuration example of a master display device and a slave display device according to the first exemplary embodiment.

FIG. 2 shows a function configuration example of the master display device 101-M and the first slave display device 101-S1. The function configuration example of the master display device 101-M is firstly described.

The master display device 101-M includes a communication unit 111, a search unit 112, a cumulative transmission and reception initiation control unit 113, a distance determination command transmission unit 114, a distance recognition unit 115, a storage unit 116, an identifier control unit 117, a time synchronization control unit 118, and a clock unit 119.

The communication unit 111 executes communications with the slave display devices 101-S in the following positions.

The search unit 112 executes device searching (discovery) targeting the slave display devices 101-S in the following positions connected by daisy chaining. This discovery represents a process that recognizes devices that are present on a network. Furthermore, the search unit 112 creates a list of slave display devices 101-S using the device information transmitted from the slave display devices 101-S as a result of the discovery, and stores it in the storage unit 116 for example.

The cumulative transmission and reception initiation control unit 113 instructs the plurality of slave display devices 101-S, via the network formed by daisy chaining, to initiate cumulative transmission and reception.

Here, cumulative transmission and reception represents a process that, for example, after temporary accumulation of received data for a predetermined accumulation time into a buffer, performs data transmission in response to the received data. The buffer in which the received data is accumulated may be provided to the interior of a data transmission and reception unit 121, for example. Furthermore, the data transmission in response to the received data includes the transfer of the received data for example. Moreover, if the received data is a command, the data transmission in response to the received data includes, for example, the transmission of a response with respect to the command represented by the received data, or a response signal such as an ACK.

In the present exemplary embodiment, when the cumulative transmission and reception initiation control unit 113 instructs the plurality of slave display devices 101-S to initiate cumulative transmission and reception, it transmits to the slave display devices 101-S in the following positions, via the network, a cumulative transmission and reception initiation command that instructs the initiation of cumulative transmission and reception.

The distance determination command transmission unit 114, following instruction of the initiation of cumulative transmission and reception by the cumulative transmission and reception initiation control unit 113, transmits a distance determination command to each of the plurality of slave display devices 101-S via the network formed by daisy chaining.

The distance determination command represents a command transmitted by the master display device 101-M for determining a network distance with respect to each of the plurality of slave display devices 101-S. Furthermore, the network distance here can be expressed, with the master display device 101-M as the origin, by the number of communication paths (cables) between display devices 101 that are passed through before reaching the slave display device 101-S thereof. Such a network distance corresponds to a hop count for example.

As one example, the distance determination command transmission unit 114 transmits a cumulative transmission and reception termination command as the distance determination command. The cumulative transmission and reception termination command represents a command that instructs the slave display device 101-S to terminate cumulative transmission and reception.

After the accumulation time elapses following the reception of the cumulative transmission and reception termination command, the plurality of slave display devices 101-S each transmit to the master display device 101-M a response signal in response to the cumulative transmission and reception termination command. The response signals transmitted in this manner are received at the master display device 101-M.

The distance recognition unit 115 determines, based on the response signals that are transmitted in the manner described above, the network distance with respect to each of the plurality of slave display devices 101-S.

That is to say, the distance recognition unit 115 recognizes the order relationship between the command processing times at which a predetermined command processing is executed in response to the reception of the distance determination command by each of the plurality of slave display devices 101-S. Further, the distance recognition unit 115 determines, based on the recognized order relationship between the command processing times, the network distance with respect to each of the plurality of controlled devices.

Specifically, the slave display devices 101-S execute, as the predetermined command processing in response to the reception of the cumulative transmission and reception termination command, the transmission of an ACK (cumulative transmission and reception termination ACK) in response to the cumulative transmission and reception termination command for example. At this time, the slave display devices 101-S append to the cumulative transmission and reception termination ACK, the transmission time of the cumulative transmission and reception termination ACK.

The distance recognition unit 115 recognizes the order relationship between the times at which the cumulative transmission and reception termination ACKs were transmitted by each of the plurality of slave display devices 101-S, based on the transmission times appended to the received cumulative transmission and reception termination ACKs. The time at which the slave display device 101-S transmits the cumulative transmission and reception termination ACK can also be referred to as the command processing time.

The distance recognition unit 115 determines, based on the order relationship of the times that are recognized in this manner, the network distance with respect to each of the plurality of slave display devices 101-S.

Furthermore, each time the distance recognition unit 115 receives a cumulative transmission and reception termination ACK transmitted from each of the slave display devices 101-S, it stores the transmission time appended to the cumulative transmission and reception termination ACK in the storage unit 116 such that, for example, it is associated with the MAC address, and the like, of the slave display device 101-S. Further, at a stage in which the reception of the cumulative transmission and reception termination ACKs from all of the slave display devices 101-S has been completed, it compares the transmission times for each of the slave display devices 101-S that are stored in the storage unit 116. Consequently, the distance recognition unit 115 is able to recognize the order relationship between the times at which the cumulative transmission and reception termination ACKs were transmitted by each of the plurality of slave display devices 101-S.

With the cumulative transmission and reception termination ACK being appended to a reception time at which the cumulative transmission and reception termination command is received, the distance recognition unit 115 may determine the order relationship between the times at which the cumulative transmission and reception termination ACKs were transmitted by each of the plurality of slave display devices 101-S based on a comparison result of the reception times. This is because the reception time, in the same manner as the cumulative transmission and reception termination ACK, is further shifted by the accumulation time in the order of the first slave display device 101-S1 to the eighth slave display device 101-S8 as a result of cumulative transmission and reception executed by the slave display devices 101-S.

The identifier control unit 117 determines, based on the network distances with respect to each of the plurality of slave display devices 101-S recognized by the distance recognition unit 115, an identifier for each of the plurality of slave display devices 101-S. Further, the identifier control unit 117 sets to each of the plurality of slave display devices 101-S, via the network formed by daisy chaining, the identifiers determined for each of the slave display devices 101-S.

The time synchronization control unit 118 executes a control for synchronizing the times of each of the slave display devices 101-S to the current time that is timed by the clock unit 119. An accurate current time is set to the clock unit 119 by means of the time synchronization control unit 118 connecting to an external NTP (Network Time Protocol) server for example.

As a specific example, the time synchronization control unit 118 may start up an ntpd service as a control for synchronizing the times of each of the slave display device 101-S.

[Configuration Example of Slave Display Device]

The configuration of the first slave display device 101-S1 is likewise described with reference to FIG. 2.

The first slave display device 101-S1 shown in the figure includes a data transmission and reception unit 121, an identifier setting unit 122, a time synchronization unit 123, and a clock unit 124.

In a case where the data transmission and reception unit 121 receives a cumulative transmission and reception termination command as received data after being instructed by the cumulative transmission and reception initiation control unit 113 of the master display device 101-M to initiate cumulative transmission and reception, it executes the processing described below. That is to say, after the accumulation time elapses following the reception of the cumulative transmission and reception termination command, the data transmission and reception unit 121 transmits, via the network, a cumulative transmission and reception termination ACK to the master display device 101-M. Furthermore, in addition to this, the data transmission and reception unit 121 transmits via the network, the received cumulative transmission and reception termination command to the second slave display device 101-S2 in the next position.

The data transmission and reception unit 121 sets a cumulative transmission and reception mode during the interval from the instruction to initiate cumulative transmission and reception until the instruction to terminate cumulative transmission and reception, and executes cumulative transmission and reception according to the reception of data in the manner described above.

On the other hand, the data transmission and reception unit 121 sets a non-cumulative transmission and reception mode when initiation of cumulative transmission and reception is not instructed, and executes data transmission in response to the received data without accumulating the received data. Data transmission and reception by such a non-cumulative transmission and reception mode is also referred to as cut-through.

The time synchronization unit 123 synchronizes the current time that is timed by the clock unit 124 to the current time that is timed by the clock unit 119 of the master display device 101-M according to control by the time synchronization control unit 118 of the master display device 101-M.

The second slave display device 101-S2 to the eighth slave display device 101-S8 may have the same configuration as the first slave display device 101-S1 shown in FIG. 2. However, the second slave display device 101-S2 to the eighth slave display device 101-S8 respectively have, according to the connection sequence in the daisy chain, different slave display devices 101-S connected in the previous position and the following position. Furthermore, a slave display device is not connected in the following position of the eighth slave display device 101-S8, since it represents the end of the daisy chain.

[Display Device ID Setting Procedure for RS232C Case]

Here, as a comparison with the present exemplary embodiment, a display device ID setting procedure for a case where a master display device 101-M and slave display devices 101-S are connected by daisy chaining by a data interface conforming to RS232C is described with reference to FIG. 3 to FIG. 9.

In FIG. 3 to FIG. 9, for convenience in simplifying the illustrations, shown is an example in which four display devices 101, namely a master display device 101-M in a first position, and a first slave display device 101-S1 to a third slave display device 101-S3 in a second to a fourth position, are connected by daisy chaining.

Figure 3:
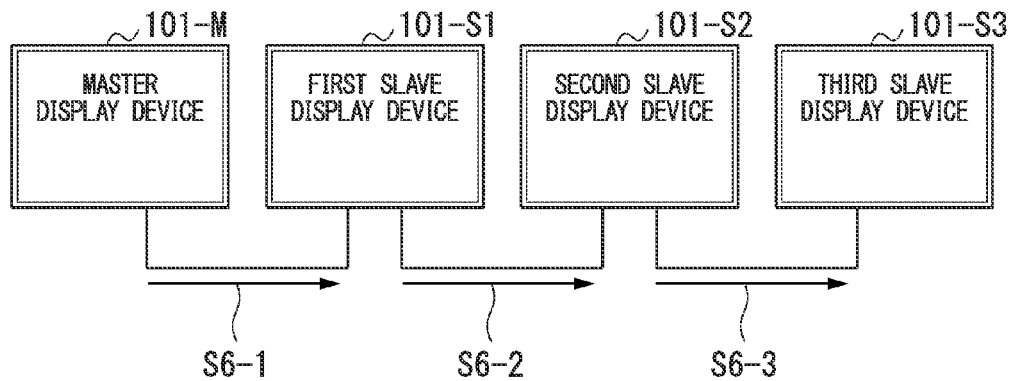
FIG. 3 is a diagram showing a display device ID setting procedure for a multi-screen display system in which display devices are connected by daisy chaining by RS232C.

When the master display device 101-M sets the display device IDs, as represented by steps S6-1 to S6-3 in FIG. 3, it firstly transmits via the daisy chain connection an automatic ID execution command with respect to the plurality of slave display devices 101-S in the following positions.

The automatic ID execution command transmitted in such a manner is received in the order of the first slave display device 101-S1, the second slave display device 101-S2, and the third slave display device 101-S3.

Figure 4:
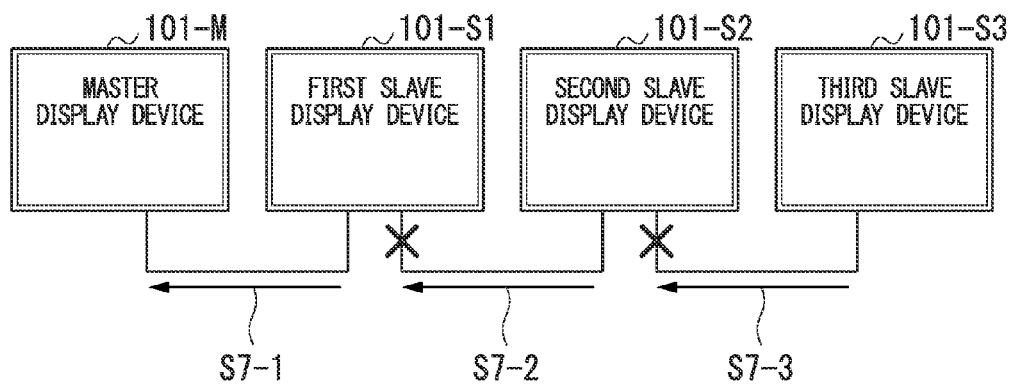
FIG. 4 is a diagram showing a display device ID setting procedure for a multi-screen display system in which display devices are connected by daisy chaining by RS232C.

The first slave display device 101-S1, the second slave display device 101-S2, and the third slave display device 101-S3, which have received the automatic ID execution command, execute the operations described below. That is to say, as shown in FIG. 4, the slave display devices 101-S set a state in which the communication path with the following position is cut off. However, in this case, it is not necessary for the third slave display device 101-S3 to cut off the communication path with the following position since it represents the end of the daisy chain. Moreover, each of the slave display devices 101-S, as represented by steps S7-1 to S7-3 in FIG. 4, transmits an ID request with respect to the master display device 101-M via the communication path in the direction of the previous position in the daisy chain.

Here, as shown in FIG. 4, the first slave display device 101-S1, the second slave display device 101-S2, and the third slave display device 101-S3, respectively transmit an ID request in response to the reception of the automatic ID execution command. However, at this time, the slave display device 101-S1 and the second slave display device 101-S2 have cut off the communication path with the following position. Consequently, the ID requests transmitted by the second slave display device 101-S2 and the third slave display device 101-S3 do not reach the master display device 101-M. Therefore, the master display device 101-M firstly receives only the ID request transmitted by the first slave display device 101-S1.

Furthermore, if the slave display device 101-S does not receive a response after a fixed time has elapsed from the transmission time of the ID request, it transmits the ID request again. Therefore, the second slave display device 101-S2 and the third slave display device 101-S3, when in a state where the communication path with the previous position is cut off, repeatedly transmit an ID request at every fixed time interval.

In the manner described above, the master display device 101-M initially (first) receives, as a response to the automatic ID execution command that itself sent, the ID request transmitted by the first slave display device 101-S1.

Figure 5:
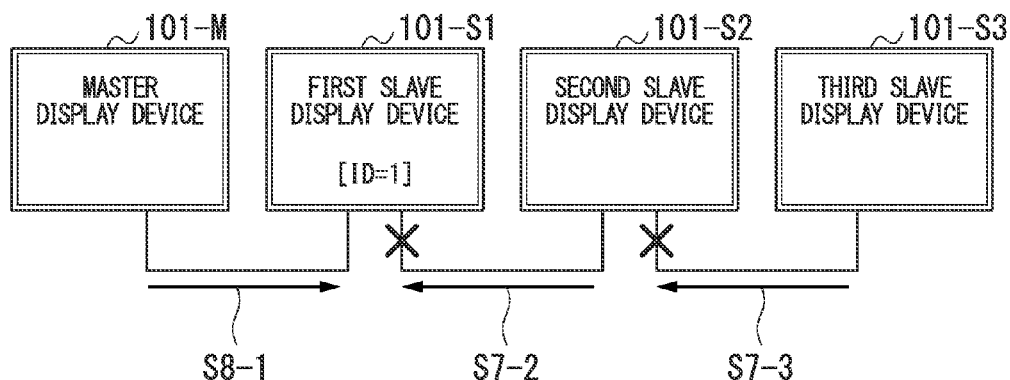
FIG. 5 is a diagram showing a display device ID setting procedure for a multi-screen display system in which display devices are connected by daisy chaining by RS232C.

The master display device 101-M, as represented by step S8-1 in FIG. 5, as a response to the ID request received first, executes a control for setting a display device ID of "1" to the first slave display device 101-S1, which represents the source of the first ID request. Consequently, the master display device 101-M transmits as a response to the ID request, a notification indicating that the display device ID number is "1" for example.

Figure 6:
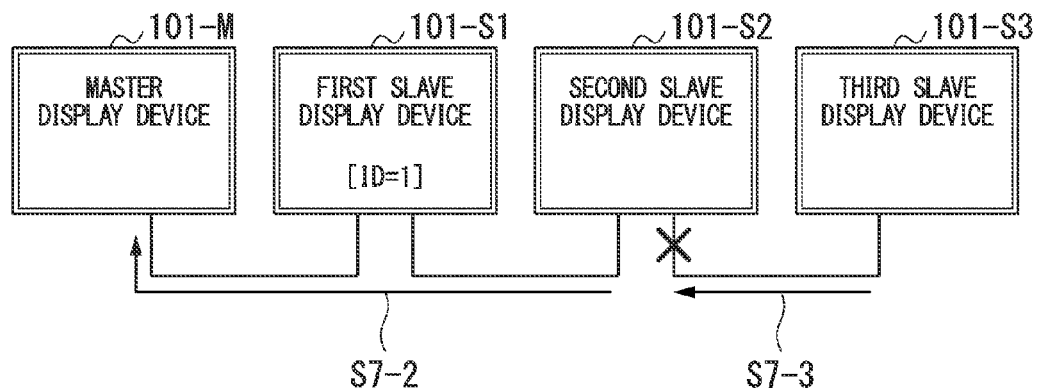
FIG. 6 is a diagram showing a display device ID setting procedure for a multi-screen display system in which display devices are connected by daisy chaining by RS232C.

The first slave display device 101-S1, to which a display device ID has set in this manner, connects the communication path with the following position that has been cut off until this point, as represented by the transition from FIG. 5 to FIG. 6. Consequently, as shown in step S7-2 in FIG. 6, the ID request transmitted by the second slave display device 101-S2 is received second at the master display device 101-M. At this time, a state is continued in which the communication path with the position following the second slave display device 101-S2 is still cut off. Therefore, the ID request transmitted by the third slave display device 101-S3 is not received by the master display device 101-M.

Figure 7:
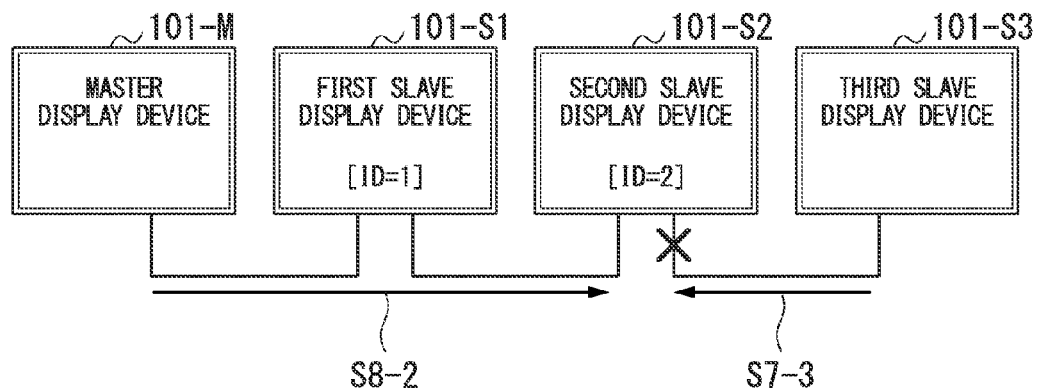
FIG. 7 is a diagram showing a display device ID setting procedure for a multi-screen display system in which display devices are connected by daisy chaining by RS232C.

When the master display device 101-M receives the second ID request, as represented by step S8-2 in FIG. 7, it executes a control for setting a display device ID of "2" with respect to the second slave display device 101-S2, which represents the source of the second ID request.

Figure 8:
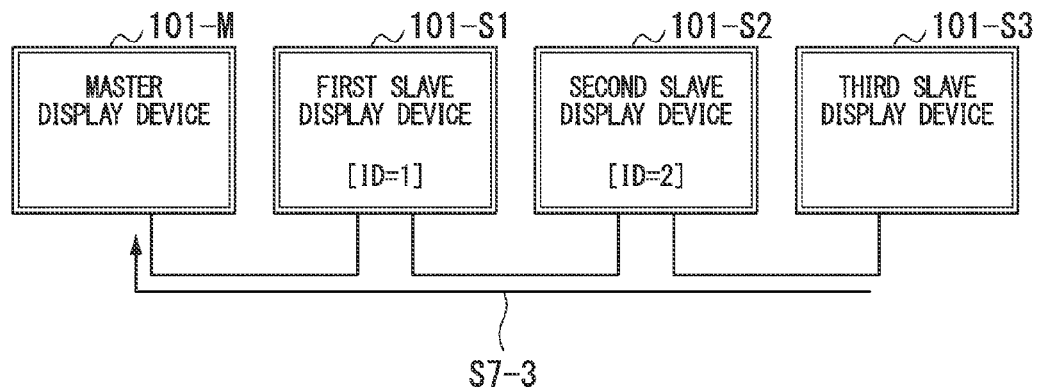
FIG. 8 is a diagram showing a display device ID setting procedure for a multi-screen display system in which display devices are connected by daisy chaining by RS232C.

The second slave display device 101-S2, to which a display device ID has set, connects the communication path with the following position that has been cut off to this point, as represented by the transition from FIG. 7 to FIG. 8. Consequently, as shown in step S7-3 in FIG. 8, the ID request transmitted by the third slave display device 101-S3 is received as a third ID request at the master display device 101-M.

Figure 9:
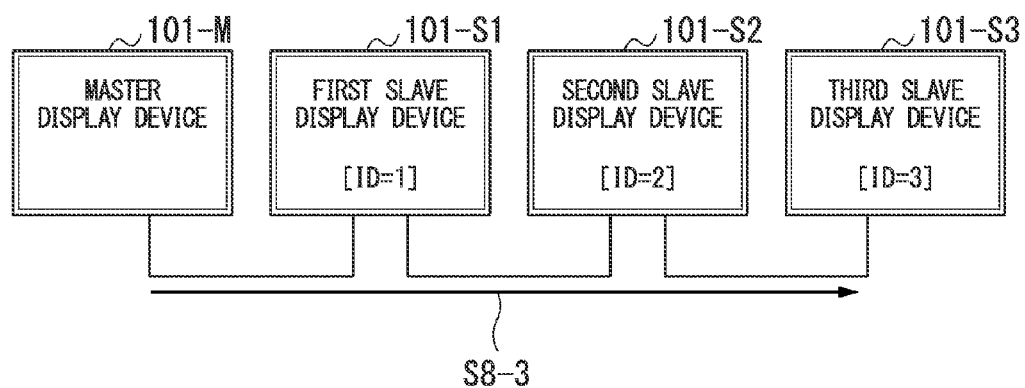
FIG. 9 is a diagram showing a display device ID setting procedure for a multi-screen display system in which display devices are connected by daisy chaining by RS232C.

When the master display device 101-M receives the third ID request, as represented by step S8-3 in FIG. 9, it executes a control for setting a display device ID of "3" with respect to the third slave display device 101-S3, which represents the source of the third ID request.

In this manner, in a case where the display devices 101 are connected by daisy chaining under a data interface conforming to RS232C, it is possible to set the display device IDs as a number that corresponds to the connection sequence of the daisy chain according to the communication procedure prescribed by the RS232C protocol. Here, it is common for the connection sequence of the display devices 101 in the daisy chain to be, for example, associated with the arrangement pattern of the display devices 101 in the multi-screen display system as described in FIG. 1. Therefore, the setting of the display device IDs as a number that corresponds to the connection sequence of the daisy chain is also equivalent to the setting of display device IDs according to the arrangement pattern of the display devices 101 in the multi-screen display system 100.

However, if the display devices 101 are connected by a network such as a LAN in the manner of the present exemplary embodiment, the communication protocol thereof becomes different from RS232C. Consequently, the display device IDs can no longer be set following the communication procedure under the RS232C standard.

In a case where the display devices 101 are connected by a network, the use of IP addresses or MAC addresses as display device IDs can also be considered for example. However, if display device IDs corresponding to the connection sequence of the daisy chain (that is to say, the arrangement pattern of the display devices 101) can be set for example in the same manner as RS232C, there are advantages such as the algorithms for display control, and the like, that support RS232C also being applicable to a multi-screen display system in which the display devices 101 are connected by a network, without large modifications.

Therefore, in the first embodiment, as described below, display device IDs representing a number corresponding to the connection sequence of the daisy chain are made automatically settable.

[Setting Procedure Example of Display Device IDs for Present Exemplary Embodiment]

A procedure example in which the master display device 101-M of the present exemplary embodiment sets display device IDs for each of the slave display devices 101-S is described with reference to FIG. 10 to FIG. 16.

Figure 10:
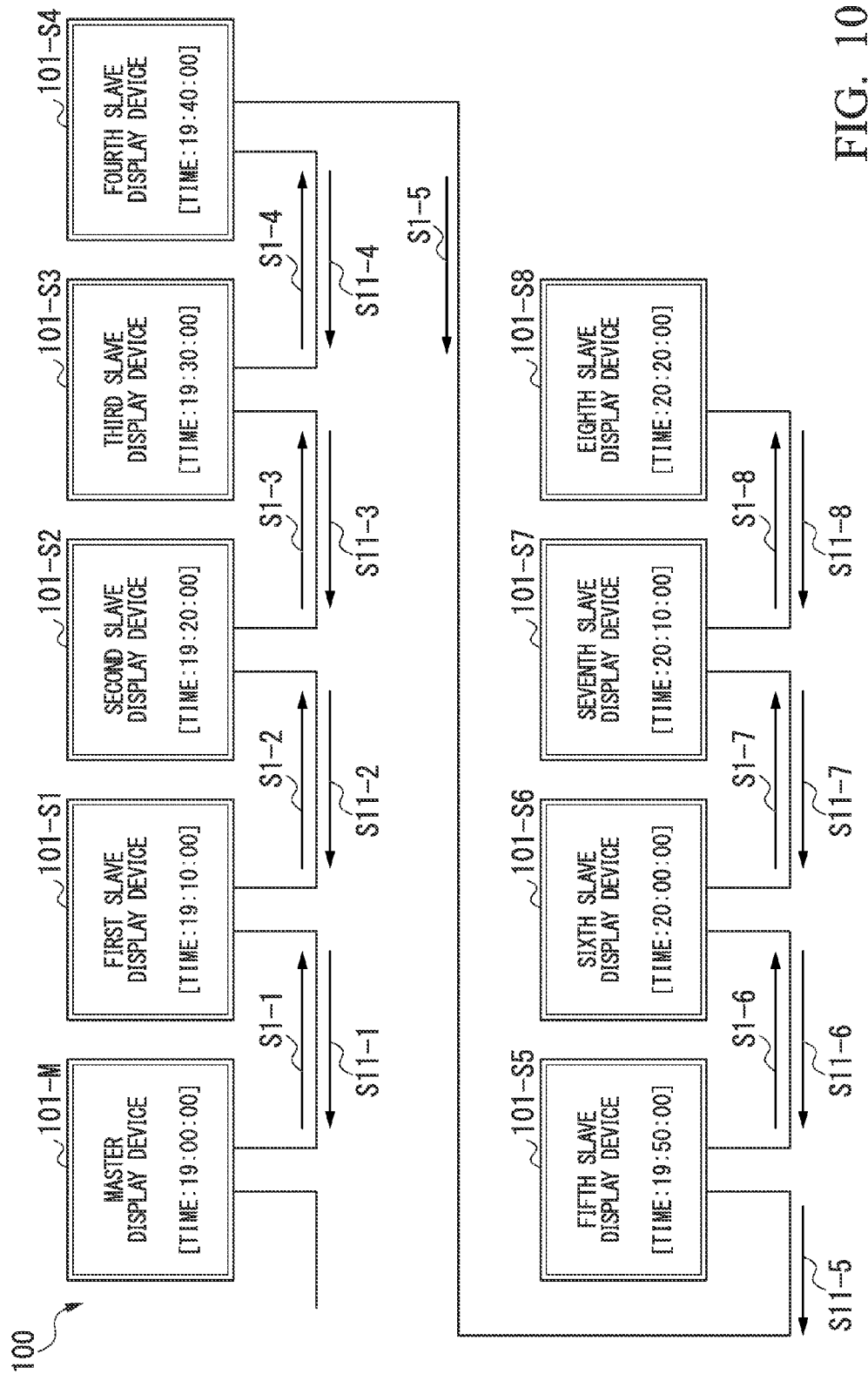
FIG. 10 is a diagram showing a display device ID setting procedure for a multi-screen display system of the first exemplary embodiment.

FIG. 10 schematically shows a network configuration in which the multi-screen display system 100 is formed by connecting by daisy chaining the master display device 101-M and the first slave display device 101-S1 to the eighth slave display device 101-S8.

As described for FIG. 1, in the daisy chain, the master display device 101-M is connected in the first position, and the first slave display device 101-S1 to the eighth slave display device 101-S8 are sequentially connected in the second position onwards. FIG. 10 shows a mode in which the master display device 101-M and the first slave display device 101-S1 to the eighth slave display device 101-S8 are connected by daisy chaining in this connection sequence.

In order to set the display device IDs, firstly, the master display device 101-M and the first slave display device 101-S1 to the eighth slave display device 101-S8 are started up. Directly after start up, the time synchronization control unit 118 of the master display device 101-M performs time synchronization by means of communication with an external NTP server for example. In contrast, the first slave display device 101-S1 to the eighth slave display device 101-S8, which are in the second position onwards in the daisy chain network, are not directly connected with the external NTP server, and are in a state in which time synchronization has not been performed.

In FIG. 10, as a result of the master display device 101-M performing time synchronization, a time of "19(h):00(min):00(sec)" is set as the current time that is timed by the clock unit 119. In contrast, time synchronization has not yet been carried out for the first slave display device 101-S1 to the eighth slave display device 101-S8. Therefore, they are in a state in which the current times that are timed by the respective clock units 124 are different from "19:00:00".

In this state, firstly, the search unit 112 of the master display device 101-M executes discovery for detecting the devices (in this case, a plurality of slave display devices 101-S) that are connected in the second position onwards in the daisy chain according to a predetermined protocol that supports a network.

Consequently, the search unit 112, as shown by steps S1-1 to S1-8 in FIG. 10 for example, transmits via the network formed by daisy chaining, a query representing the discovery, by a broadcast, or by a multicast targeting the slave display devices 101-S that are connected by daisy chaining.

In response to the query representing the discovery, the data transmission and reception units 121 of the first slave display device 101-S1 to the eighth slave display device 101-S8 transmit, as shown by steps S11-1 to S11-8 in FIG. 10, device information in the direction of the previous position in the daisy chain.

The master display device 101-M uses the device information respectively received from the first slave display device 101-S1 to the eighth slave display device 101-S8 to create a list of slave display devices 101-S.

Figure 11:
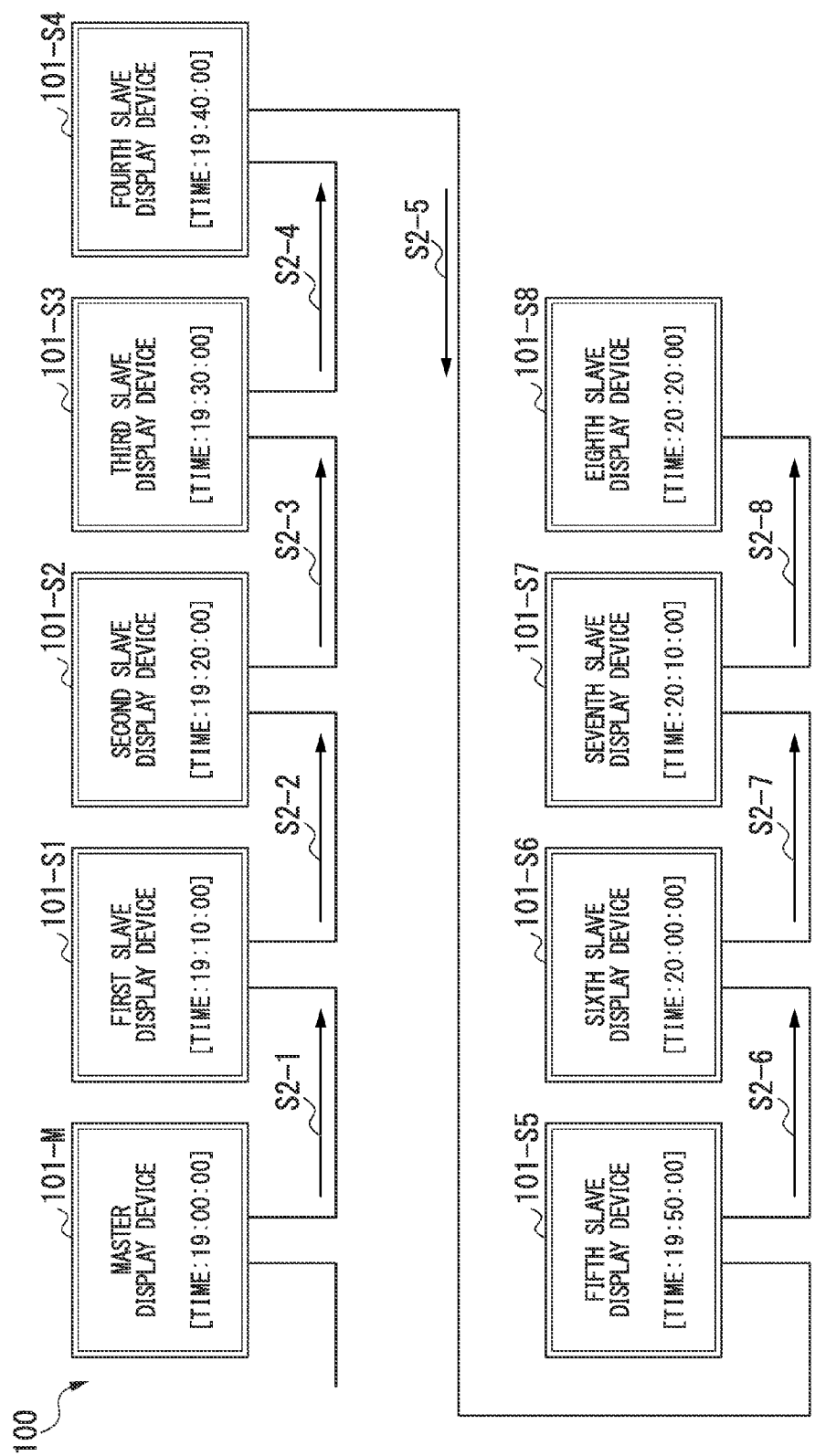
FIG. 11 is a diagram showing a display device ID setting procedure for a multi-screen display system of the first exemplary embodiment.

Next, the time synchronization control unit 118 of the master display device 101-M, as shown by steps S2-1 to S2-8 in FIG. 11, transmits via the network formed by daisy chaining, a time synchronization command with respect to the first slave display device 101-S1 to the eighth slave display device 101-S8. The time synchronization command is a command that instructs the slave display devices 101-S to perform time synchronization.

At this time, the master display device 101-M may start up an ntpd service as mentioned above, and transmit a time synchronization command by means of a functionality of the ntpd service for example. Furthermore, the master display device 101-M may transmit the time synchronization command by a broadcast or a multicast for example.

Moreover, when the time synchronization units 123 of the first slave display device 101-S1 to the eighth slave display device 101-S8 execute time synchronization in response to the reception of the time synchronization command, a processing sequence for time synchronization according to ntpq prescribed by the NTP may be executed.

Figure 12:
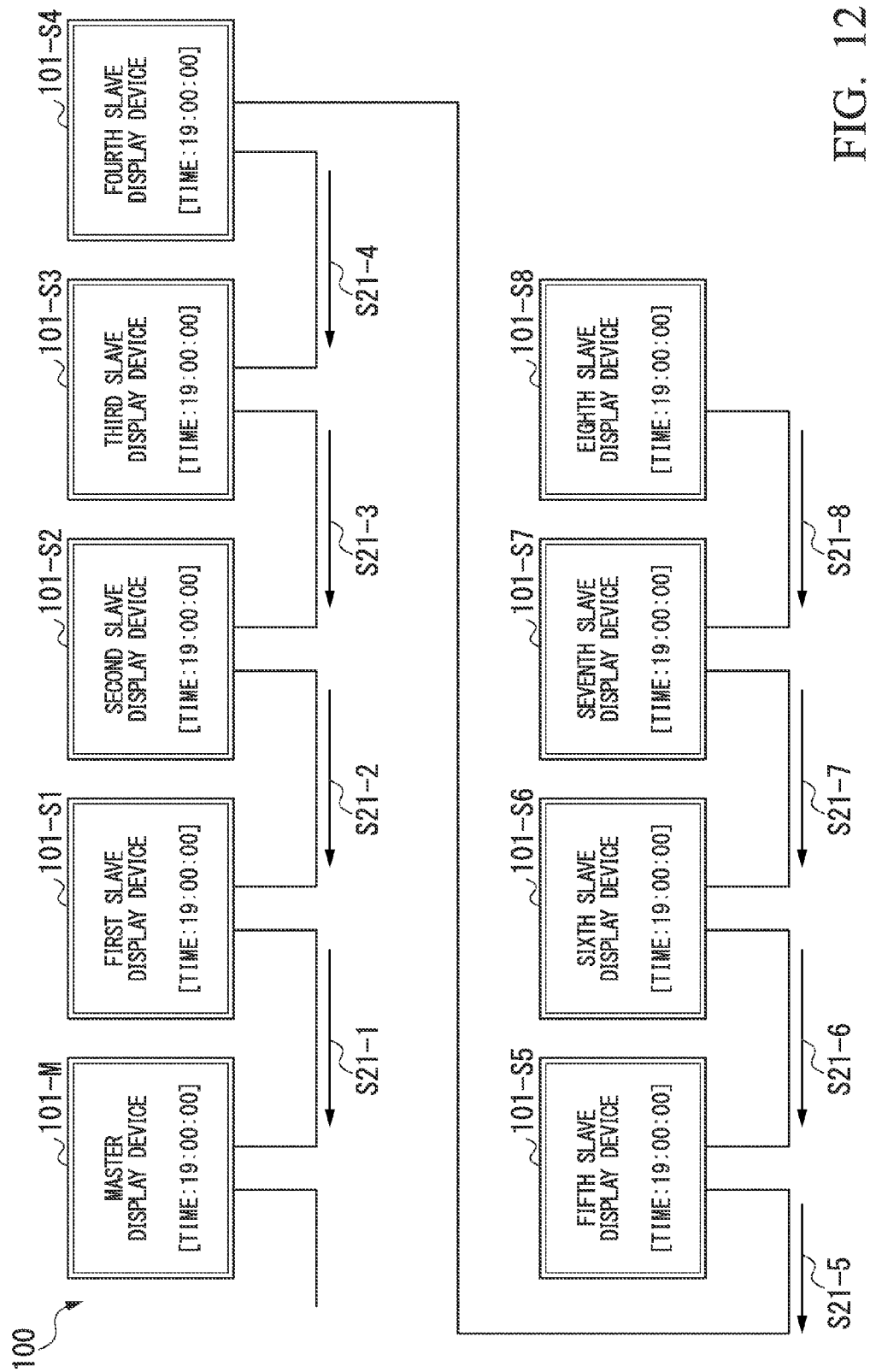
FIG. 12 is a diagram showing a display device ID setting procedure for a multi-screen display system of the first exemplary embodiment.

The data transmission and reception units 121 of the first slave display device 101-S1 to the eighth slave display device 101-S8 transmit, in response to the completion of time synchronization processing, as shown by steps S21-1 to S21-8 in FIG. 12, an ACK (Acknowledge) to the master display device 101-M in response to the reception of the time synchronization command.

In a state where time synchronization processing has been completed for each of the first slave display device 101-S1 to the eighth slave display device 101-S8, as likewise shown in FIG. 12, the time that is timed by the clock units 124 of the first slave display device 101-S1 to the eighth slave display device 101-S8 is synchronized to the same "19:00:00" as the master display device 101-M.

Time has elapsed to some extent in arriving at the stage of FIG. 12 from FIG. 10. However, here, for convenience in simplifying the descriptions, the time elapsed in arriving at FIG. 12 from FIG. 10 is not considered, and the current time shown in FIG. 12 is made "19:00:00" in the same manner as FIG. 10.

In a state where the times of the slave display devices 101-S are synchronized with the time of the master display device 101-M in the manner of FIG. 12, the cumulative transmission and reception initiation control unit 113 of the master display device 101-M controls the data transmission and reception of the slave display devices 101-S such that it becomes cumulative transmission and reception. Therefore, the cumulative transmission and reception initiation control unit 113 transmits, as shown by steps S3-1 to S3-8 in FIG. 13, a cumulative transmission and reception initiation command with respect to the first slave display device 101-S1 to the eighth slave display device 101-S8. The cumulative transmission and reception initiation command represents a command that instructs the initiation of a data transmission and reception operation representing cumulative transmission and reception. The cumulative transmission and reception initiation control unit 113 may transmit the cumulative transmission and reception initiation command by a broadcast or a multicast for example.

The data transmission and reception units 121 of the first slave display device 101-S1 to the eighth slave display device 101-S8 set with respect to their own data transmission and reception operation a cumulative transmission and reception mode in response to the reception of the cumulative transmission and reception initiation command. As one example, the accumulation time for cumulative transmission and reception here is set to 10 msec.

The data transmission and reception unit 121, which has set the cumulative transmission and reception mode in this manner, thereafter executes a data transmission and reception representing cumulative transmission and reception, in which each time data is received, the received data thereof is accumulated over a fixed accumulation time, and data transmission is executed after the elapsing of the accumulation time.

With respect to the cumulative transmission and reception initiation command, the data transmission and reception unit 121 may not transmit an ACK in response to the reception thereof to the master display device 101-M.

Next, the distance determination command transmission unit 114 of the master display device 101-M transmits a cumulative transmission and reception termination command, which represents an example of a distance determination command. The cumulative transmission and reception termination command represents a command that instructs the termination of cumulative transmission and reception. The distance determination command transmission unit 114 transmits the cumulative transmission and reception termination command by a broadcast or a multicast for example.

Here, the processing executed by the slave display devices 101-S in the following positions in response to reception of the cumulative transmission and reception termination command is described with reference to FIG. 14.

Figure 14:
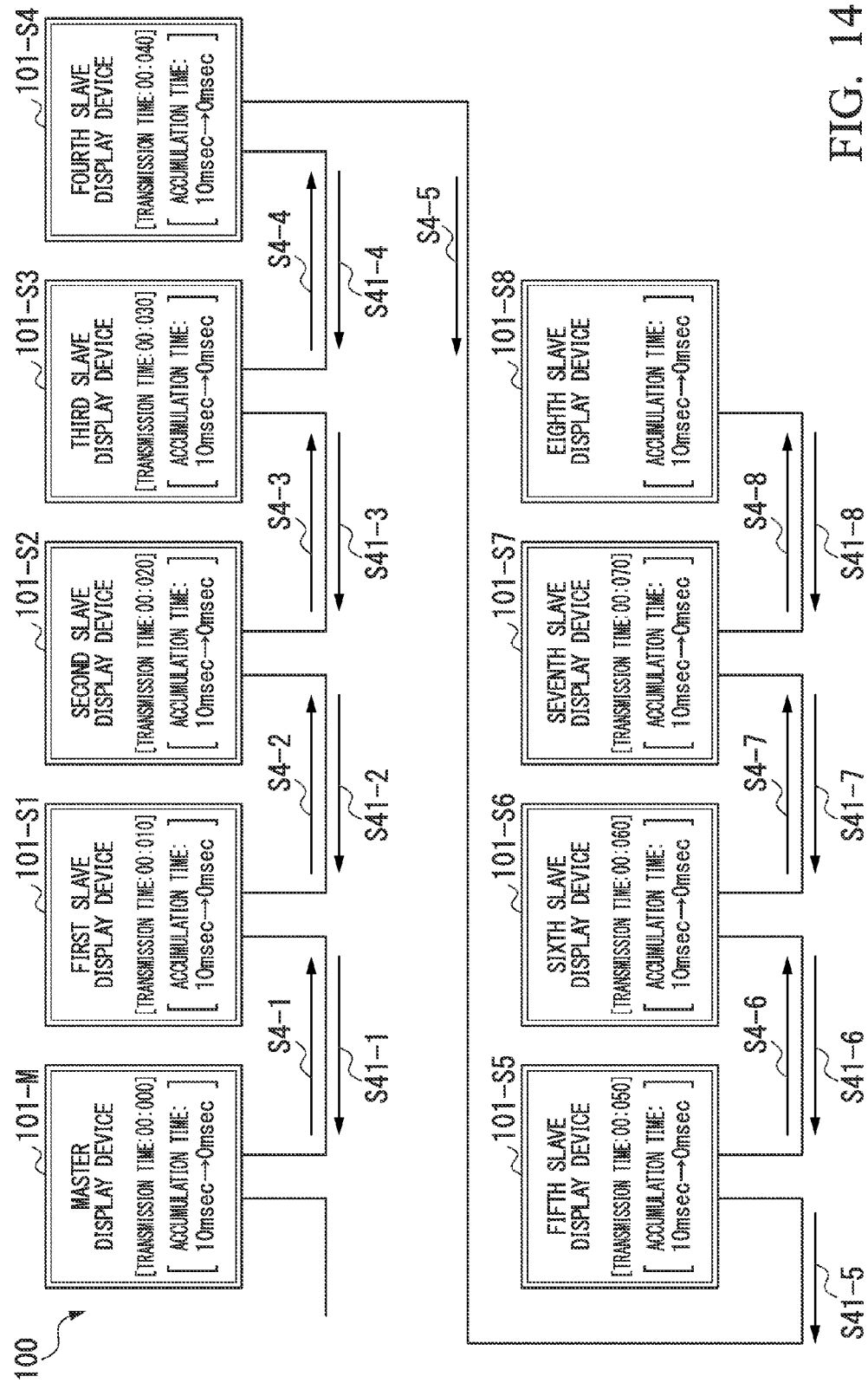
FIG. 14 is a diagram showing a display device ID setting procedure for a multi-screen display system of the first exemplary embodiment.

In FIG. 14, the transmission time at which the first slave display device 101-S1 to the seventh slave display device 101-S7 respectively transferred the cumulative transmission and reception termination command to the following position is relatively shown, with the transmission time at which the master display device 101-M transmitted the cumulative transmission and reception termination command as a reference (00(sec):000(msec)). Furthermore, in the following description, for convenience in making the descriptions easily understood, it is assumed that there are no transmission delays between the display devices 101, and that the only factor in the delay is the accumulation time of 10 msec set to the slave display devices 101-S.

At a transmission time of "00:000", the distance determination command transmission unit 114 of the master display device 101-M transmits the cumulative transmission and reception termination command to the following position in the daisy chain (step S4-1). Consequently, the data transmission and reception unit 121 of the first slave display device 101-S1 receives the cumulative transmission and reception termination command with a timing representing the same time of "00:000" as the transmission time of the master display device 101-M.

At this time, the data transmission and reception unit 121 of the first slave display device 101-S1 has set the cumulative transmission and reception mode. Consequently, the data transmission and reception unit 121 of the first slave display device 101-S1 executes cumulative transmission and reception in response to the reception of the cumulative transmission and reception termination command.

That is to say, the data transmission and reception unit 121 of the first slave display device 101-S1 initiates the accumulation of the received cumulative transmission and reception termination command. Further, with a timing representing a transmission time of "00:010", in which the 10 msec representing the accumulation time from the initiation of the accumulation has elapsed, the data transmission and reception unit 121 of the first slave display device 101-S1 transmits the cumulative transmission and reception termination command to the communication path leading to the following position in the daisy chain (step S4-2).

Furthermore, the data transmission and reception unit 121 of the first slave display device 101-S1, with a timing representing the same transmission time of "00:010", terminates the cumulative transmission and reception mode. At this time, the data transmission and reception unit 121 of the first slave display device 101-S1 resets the accumulation time from 10 msec to 0 msec for example. Consequently, the cumulative transmission and reception mode is terminated and the non-cumulative transmission and reception mode is set.

Moreover, the data transmission and reception unit 121 of the first slave display device 101-S1, with a timing representing the same transmission time of "00:010", transmits a cumulative transmission and reception termination ACK (step S41-1). At this time, the data transmission and reception unit 121 of the first slave display device 101-S1 appends the transmission time thereof to the ACK.

For example, if the time at which the cumulative transmission and reception termination command is received from the master display device 101-M is "19(h):00(min):00 (sec):000(msec)", the transmission time appended by the first slave display device 101-S1 to the ACK is 10 msec later thereof, namely "19:00:00:010".

Further, the data transmission and reception unit 121 of the second slave display device 101-S2 receives the cumulative transmission and reception termination command at the same time "00:010" as the transmission time "00:010" of the cumulative transmission and reception termination command by the first slave display device 101-S1. In response to the reception of the cumulative transmission and reception termination command, the data transmission and reception unit 121 of the second slave display device 101-S2, in the same manner as the case of the first slave display device 101-S1, accumulates the received cumulative transmission and reception termination command over a period of 10 msec.

Then, the data transmission and reception unit 121 of the second slave display device 101-S2 executes the processing described below after the elapsing of the accumulation time at a transmission time of "00:020". That is to say, the data transmission and reception unit 121 of the second slave display device 101-S2 terminates the cumulative transmission and reception mode. Furthermore, the data transmission and reception unit 121 of the second slave display device 101-S2 transmits to the following position (third slave display device 101-S3), the cumulative transmission and reception termination command (step S4-3). Moreover, the data transmission and reception unit 121 of the second slave display device 101-S2 transmits to the master display device 101-M, an ACK appended with the transmission time (step S41-2).

Thereafter, in the same manner, the data transmission and reception units 121 of the third slave display device 101-S3 to the eighth slave display device 101-S8 receive the cumulative transmission and reception termination command from the slave display device 101-S in the previous position. The reception times shift in the order of the third slave display device 101-S3 to the eighth slave display device 101-S8 such that they are each delayed by a further 10 msec, which represents the accumulation time.

Further, the data transmission and reception units 121 of the third slave display device 101-S3 to the eighth slave display device 101-S8 accumulate the received cumulative transmission and reception termination command over the accumulation time of 10 msec, and execute the processing described below at a timing in which the accumulation time has elapsed.

That is to say, the data transmission and reception units 121 of the third slave display device 101-S3 to the eighth slave display device 101-S8 terminate the cumulative transmission and reception mode. Furthermore, the data transmission and reception units 121 of the third slave display device 101-S3 to the seventh slave display device 101-S7 respectively transmit, with respect to the following position in the daisy chain, the cumulative transmission and reception termination command (steps S4-4 to S4-8 in FIG. 14). Moreover, the respective data transmission and reception units 121 of the third slave display device 101-S3 to the eighth slave display device 101-S8 transmit to the master display device 101-M, an ACK appended with the transmission time (steps S41-3 to S41-8 in FIG. 14).

According to the description above, the first slave display device 101-S1 to the eighth slave display device 101-S8 successively transmit a cumulative transmission and reception termination ACK at a timing in which they are respectively delayed by a further 10 msec, which corresponds to the accumulation time. As a result, the transmission times appended to the ACKs represent times that are each delayed by a further 10 msec in the order of the first slave display device 101-S1 to the eighth slave display device 101-S8.

The cumulative transmission and reception termination ACK is also referred to as a response signal.

The distance recognition unit 115 of the master display device 101-M compares the transmission times appended to the ACKs that are respectively received from the first slave display device 101-S1 to the eighth slave display device 101-S8. Based on the comparison result, the distance recognition unit 115 recognizes the order relationship between the transmission times at which the first slave display device 101-S1 to the eighth slave display device 101-S8 respectively transmitted the cumulative transmission and reception termination ACKs.

Specifically, as the order relationship between the transmission times, the distance recognition unit 115 recognizes that the transmission time of the first slave display device 101-S1 is the earliest, and then the transmission times are progressively delayed in the order of the second slave display device 101-S2 to the eighth slave display device 101-S8.

Next, the distance recognition unit 115 recognizes, based on the recognition result of the order relationship between the transmission times described above, the distances with respect to the master display device 101-M for each of the first slave display device 101-S1 to the eighth slave display device 101-S8.

In this case, the distance recognition unit 115 has recognized that the transmission times are progressively delayed in the order of the first slave display device 101-S1 to the eighth slave display device 101-S8. As can be understood from the foregoing description, for the slave display device 101-S representing the source of the cumulative transmission and reception termination ACK, the number of positions passed through on the network formed by daisy chaining until the master display device 101-M is reached increases in order from the earliest to the latest transmission time. That is to say, the network distance increases in order from the earliest to the latest transmission time.

Therefore, the distance recognition unit 115 recognizes that the network distance with respect to the master display device 101-M becomes progressively further in order from the earliest to the latest transmission time appended to the cumulative transmission and reception termination ACKs.

Specifically, the distance recognition unit 115 recognizes that the network distances for each of the first slave display device 101-S1 to the eighth slave display device 101-S8 are respectively 1 to 8 for example. The value of 1 to 8 for the distance corresponds to, for a given slave display device 101-S, the number of communication paths (cables for example) between slave display devices 101-S that are passed through until the master display device 101-M is reached for example.

Further, the identifier control unit 117 of the master display device 101-M determines, based on the distances recognized by the distance recognition unit 115 in the manner described above, a display device ID for each of the slave display devices 101-S in the following manner for example.

That is to say, the network distances for the first slave display device 101-S1 to the eighth slave display device 101-S8 are recognized as being "1" to "8" for example. Accordingly, the identifier control unit 117 determines the display device identifiers of the first slave display device 101-S1 to the eighth slave display device 101-S8 as "1" to "8", respectively, by means of a correspondence with their network distances for example.

Further, the identifier control unit 117 executes a control for setting to the first slave display device 101-S1 to the eighth slave display device 101-S8, the display device IDs of "1" to "8", as determined in the manner described above.

Figure 15:
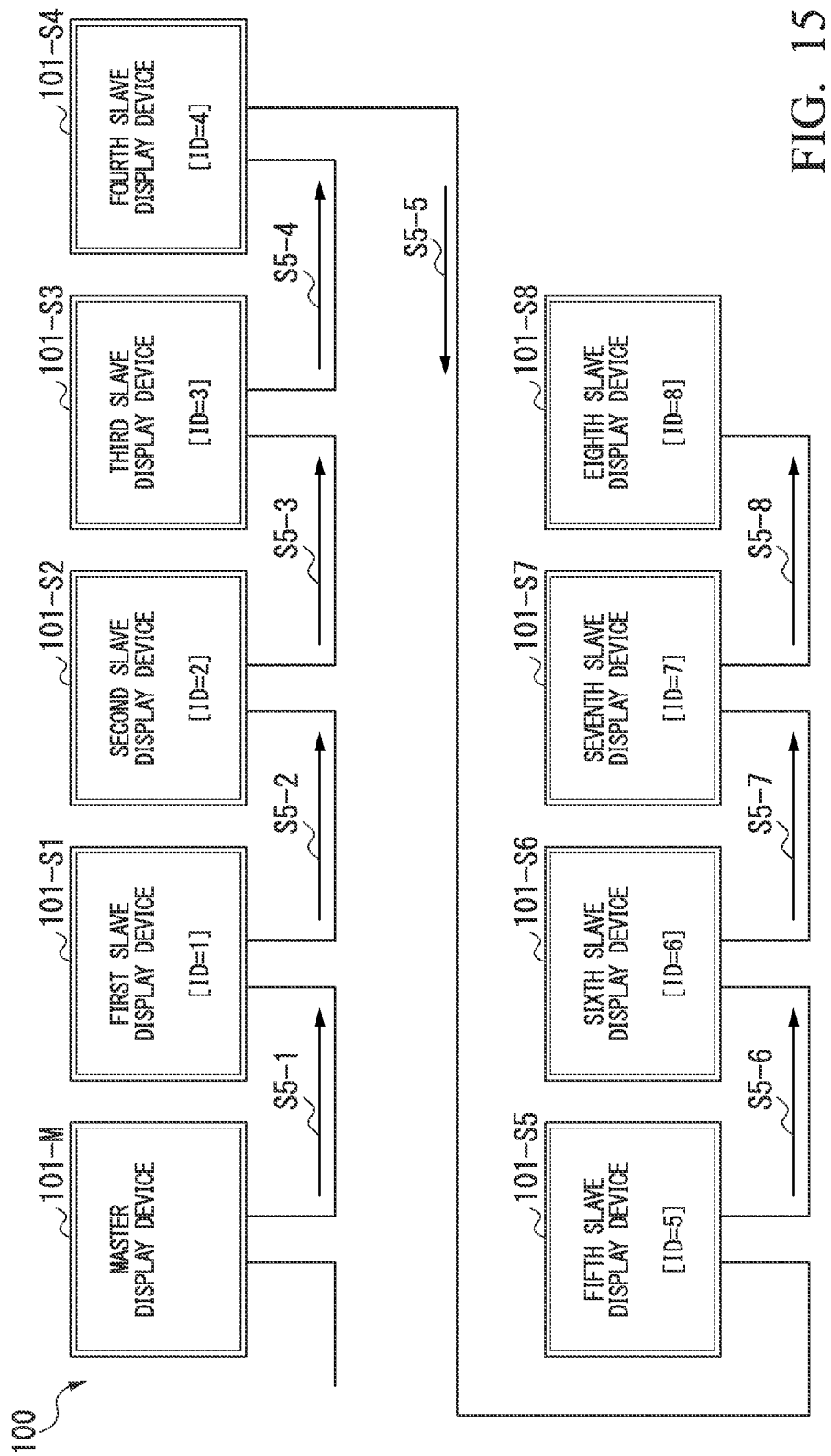
FIG. 15 is a diagram showing a display device ID setting procedure for a multi-screen display system of the first exemplary embodiment.

Therefore, as shown in FIG. 15, the identifier control unit 117 transmits by a unicast with respect to the first slave display device 101-S1, an ID setting command that instructs the setting of a display device ID of "1" (step S5-1).

The ID setting command is received by the first slave display device 101-S1 at the data transmission and reception unit 121. The identifier setting unit 122 of the first slave display device 101-S1, in response to the received ID setting command instructing the setting of a display device ID of "1", sets a display device ID of "1".

In the same manner, the identifier control unit 117 transmits by a unicast with respect to the second slave display device 101-S2 to the eighth slave display device 101-S8, ID setting commands for respectively setting display device IDs of "2" to "8" (steps S5-2 to S5-8).

Accordingly, the identifier setting units 122 of the second slave display device 101-S2 to the eighth slave display device 101-S8 respectively set display device IDs of "2" to "8".

In this manner, in the multi-screen display system of the present exemplary embodiment, the master display device 101-M performs time synchronization under a network protocol, and the transmission times of the cumulative transmission and reception termination ACKs are then shifted utilizing the cumulative transmission and reception function of the slave display devices 101-S. Further, the master display device 101-M sets in order from the closest network distance, which is recognized based on the transmission times, display device IDs to the slave display devices 101-S in an ascending order starting with "1" for example.

In this manner, the multi-screen display system of the present exemplary embodiment, even for networks in which the communication paths connected by daisy chaining are not an RS232C, and the like, is able to set in the same manner as an RS232C, display device IDs for each of the slave display devices 101-S by means of a correspondence with their connection sequence in the daisy chain for example.

Furthermore, in the first exemplary embodiment, the display device IDs for each of the slave display devices 101-S is set based on the transmission times appended to the cumulative transmission and reception termination ACKs. That is to say, in the first exemplary embodiment, the display device IDs for each of the slave display devices 101-S are set based on absolute time information, namely the transmission times of the cumulative transmission and reception termination ACKs. Consequently, the distance recognition unit 115 is able to recognize with a high accuracy the network distances with respect to each of the slave display devices 101-S.

In the example described above, display device IDs representing numbers in an ascending order starting with "1" are assigned to each of the slave display devices 101-S in order from the slave display device 101-S with a network distance (that is to say, the connection sequence of the daisy chain) closest to the master display device 101-M. However, the method of assigning display device IDs according to the network distances of the slave display devices 101-S is in no way limited to this.

As one example, display device IDs representing numbers in a descending order may also be assigned to each of the slave display devices 101-S in order from the slave display device 101-S with a network distance (that is to say, the connection sequence of the daisy chain) closest to the master display device 101-M. In this case, the display device IDs of "8" to "1" are respectively assigned in the order of the first slave display device 101-S1 to the eighth slave display device 101-S8.

Further, the display device IDs can be set, as described below, according to the network distances (the connection sequence of the daisy chain) of the slave display devices 101-S.

For example, if the master display device 101-M and the slave display devices 101-S are arranged in 3 rows×3 columns as in FIG. 1, in the first row, the first slave display device 101-S1 in the center (second column) and the second slave display device 101-S2 in the right (third row) are respectively set with display device IDs of "1" and "2". In the second row, display device IDs of "3", "4", and "5" are set in the order of the fifth slave display device 101-S5 in the left (first column), the fourth slave display device 101-S4 in the center, and the third slave display device 101-S3 in the right. In the third row, display device IDs of "6", "7", and "8" are set in the order of the sixth slave display device 101-S6 in the left, the seventh slave display device 101-S7 in the center, and the eighth slave display device 101-S8 in the right.

That is to say, the display device IDs are set with respect to the eight slave display devices 101-S in the order of "1", "2", "5", "4", "3", "6", "7", and "8", such that they correspond to an order starting with the slave display device 101-S with the closest network distance (that is to say, the connection sequence of the daisy chain).

That is to say, in this case, the display device IDs of "1" to "8" are set in an order of the left to the right in the first row, the left to the right in the second row, and the left to the right in the third row.

Furthermore, the display device IDs can also be set in the manner described below.

For example, if the master display device 101-M and the slave display devices 101-S are arranged in 3 rows×3 columns as in FIG. 1, in the first column, the fifth slave display device 101-S5 in the center position (second row) and the sixth slave display device 101-S6 in the lower position (third row) are respectively set with display device IDs of "1" and "2". In the second column, display device IDs of "3", "4", and "5" are set in the order of the first slave display device 101-S1 in the upper position (first row), the fourth slave display device 101-S4 in the center position, and the seventh slave display device 101-S7 in the lower position. In the third column, display device IDs of "6", "7", and "8" are set in the order of the second slave display device 101-S2 in the upper position, the third slave display device 101-S3 in the center position, and the eighth slave display device 101-S8 in the lower position.

In this case, the display device IDs are set with respect to the eight slave display devices 101-S in the order of "3", "6", "1", "4", "7", "2", "5", and "8", such that they correspond to an order starting with the slave display device 101-S with the closest network distance (that is to say, the connection sequence of the daisy chain).

That is to say, in this case, the display device IDs of "1" to "8" are set in an order of the upper to the lower in the first column, the upper to the lower in the second column, and the upper to the lower in the third column.

[Processing Sequence Example]

Figure 16:
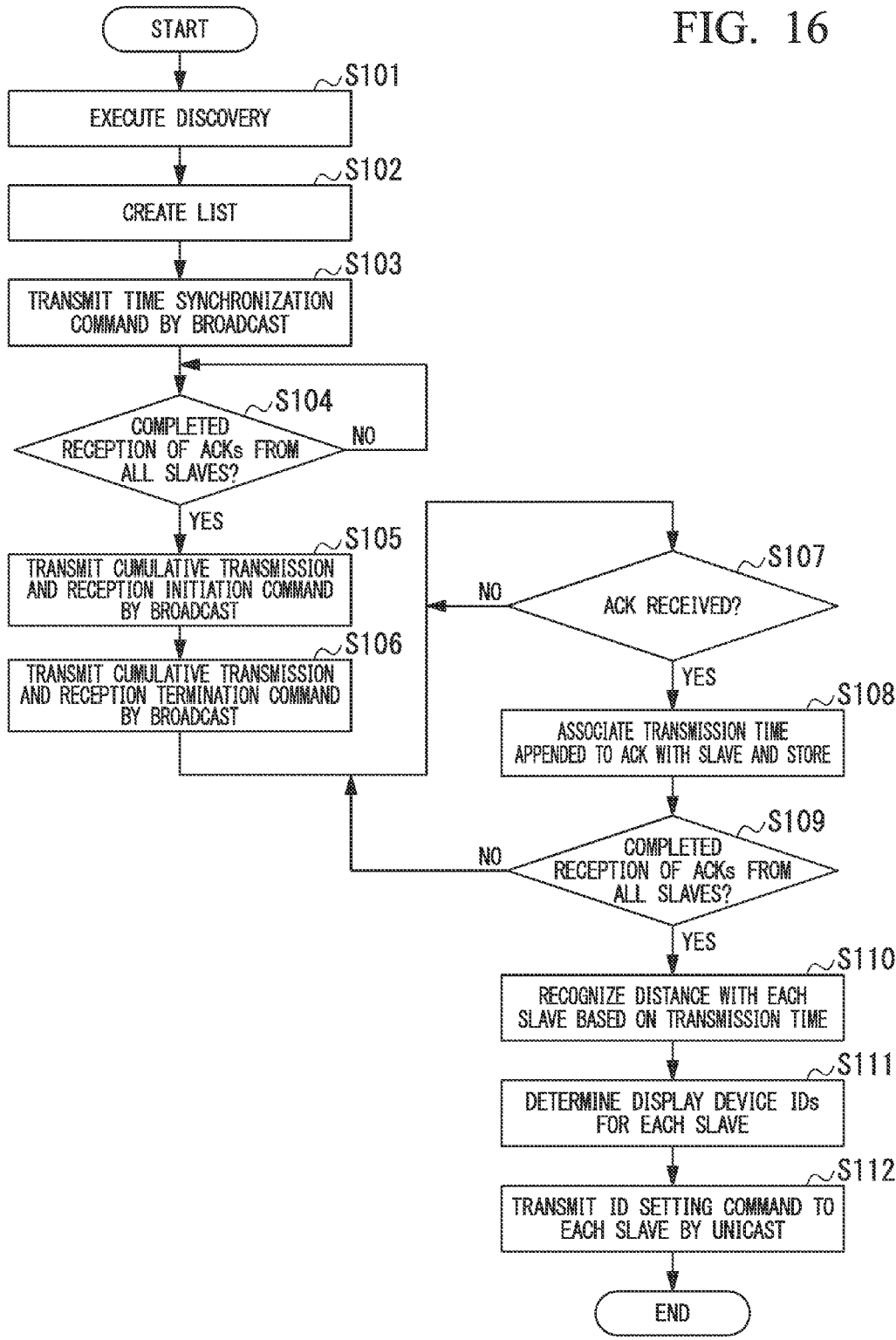
FIG. 16 is a diagram showing a processing sequence example executed by the master display device according to the first exemplary embodiment.

The flowchart in FIG. 16 represents a processing sequence example executed by the master display device 101-M according to the first exemplary embodiment in order to set the display device IDs.

Firstly, the search unit 112 executes, as described in FIG. 10, discovery on the network formed by connections via daisy chaining (step S101). Furthermore, the search unit 112 creates a list of slave display devices 101-S utilizing the device information transmitted by each of the slave display devices 101-S in response to the execution of the discovery (step S102). The search unit 112 stores the created list in the storage unit 116 for example.

Next, the time synchronization control unit 118 transmits, as described in FIG. 11, a time synchronization command with respect to the slave display devices 101-S in the direction of the following position in the daisy chain, by a broadcast or a multicast (step S103).

As described in FIG. 12, ACKs are transmitted from the slave display devices 101-S that have executed time synchronization in response to the reception of the time synchronization command. Therefore, the time synchronization control unit 118 waits for the completion of the reception of ACKs from all of the slave display devices 101-S (step S104—NO).

Figure 13:
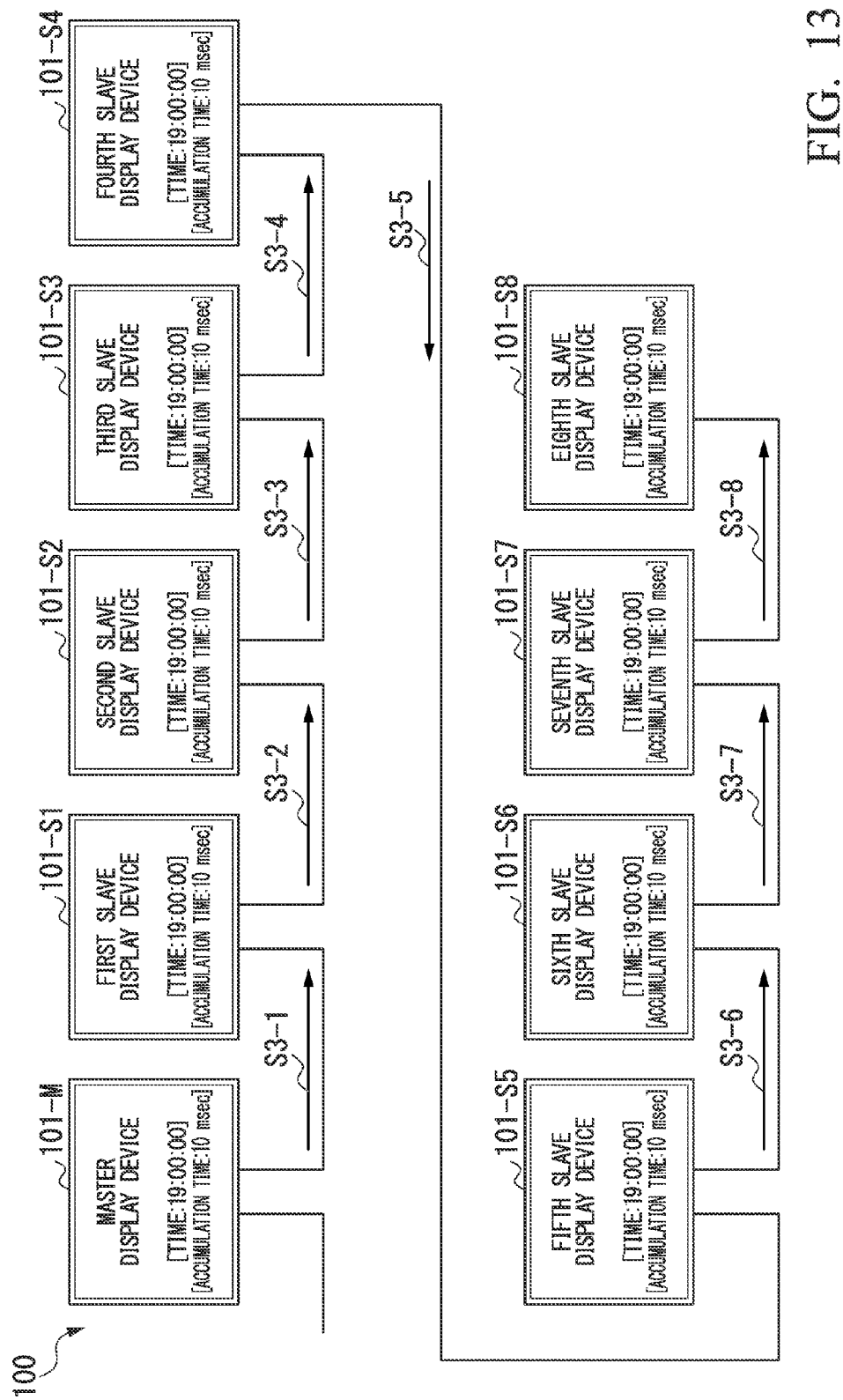
FIG. 13 is a diagram showing a display device ID setting procedure for a multi-screen display system of the first exemplary embodiment.

When the reception of ACKs from all of the slave display device 101-S is completed (step S104—YES), the distance determination command transmission unit 114 transmits, as described in FIG. 13, a cumulative transmission and reception initiation command in the direction of the following position in the daisy chain, by a broadcast or a multicast (step S105).

Then, the distance determination command transmission unit 114 transmits, as described in FIG. 14, a cumulative transmission and reception termination command in the direction of the following position in the daisy chain, by a broadcast or a multicast (step S106).

Next, the distance recognition unit 115 waits for a cumulative transmission and reception termination ACK transmitted by one of the slave display devices 101-S to be received (step S107—NO). Further, in response to the reception of a cumulative transmission and reception termination ACK (step S107—YES), the distance recognition unit 115 stores the transmission time appended to the cumulative transmission and reception termination ACK received according to step S107 of the current cycle in the storage unit 116, such that it is associated with the IP address or the MAC address of the slave display device 101-S representing the source thereof (step S108).

Then, the distance recognition unit 115 determines whether or not the reception of cumulative transmission and reception termination ACKs from all of the slave display devices 101-S specified in the list created as a result of step S102 has been completed (step S109). Here, if there are cumulative transmission and reception termination ACKs remaining that have not yet been received (step S109—NO), then the distance recognition unit 115 returns the processing to step S107.

On the other hand, if the reception of cumulative transmission and reception termination ACKs from all of the slave display devices 101-S has been completed (step S109—YES), the distance recognition unit 115 recognizes, based on the transmission times for each of the slave display devices 101-S that have been stored in the storage unit 116, the network distance of each of the slave display devices 101-S with respect to the master display device 101-M (step S110).

The identifier control unit 117 determines, based on the network distances of each of the slave display devices 101-S recognized as a result of step S110, a display device ID for each of the slave display devices 101-S (step S111). The value (number) of the display device ID determined in this manner is one corresponding to the connection sequence of the daisy chain for example.

Further, the identifier control unit 117, as described in FIG. 15, transmits by a unicast with respect to each of the slave display devices 101-S, ID setting commands that instruct the setting of the display device IDs determined as a result of step S111 (step S112).

Figure 17:
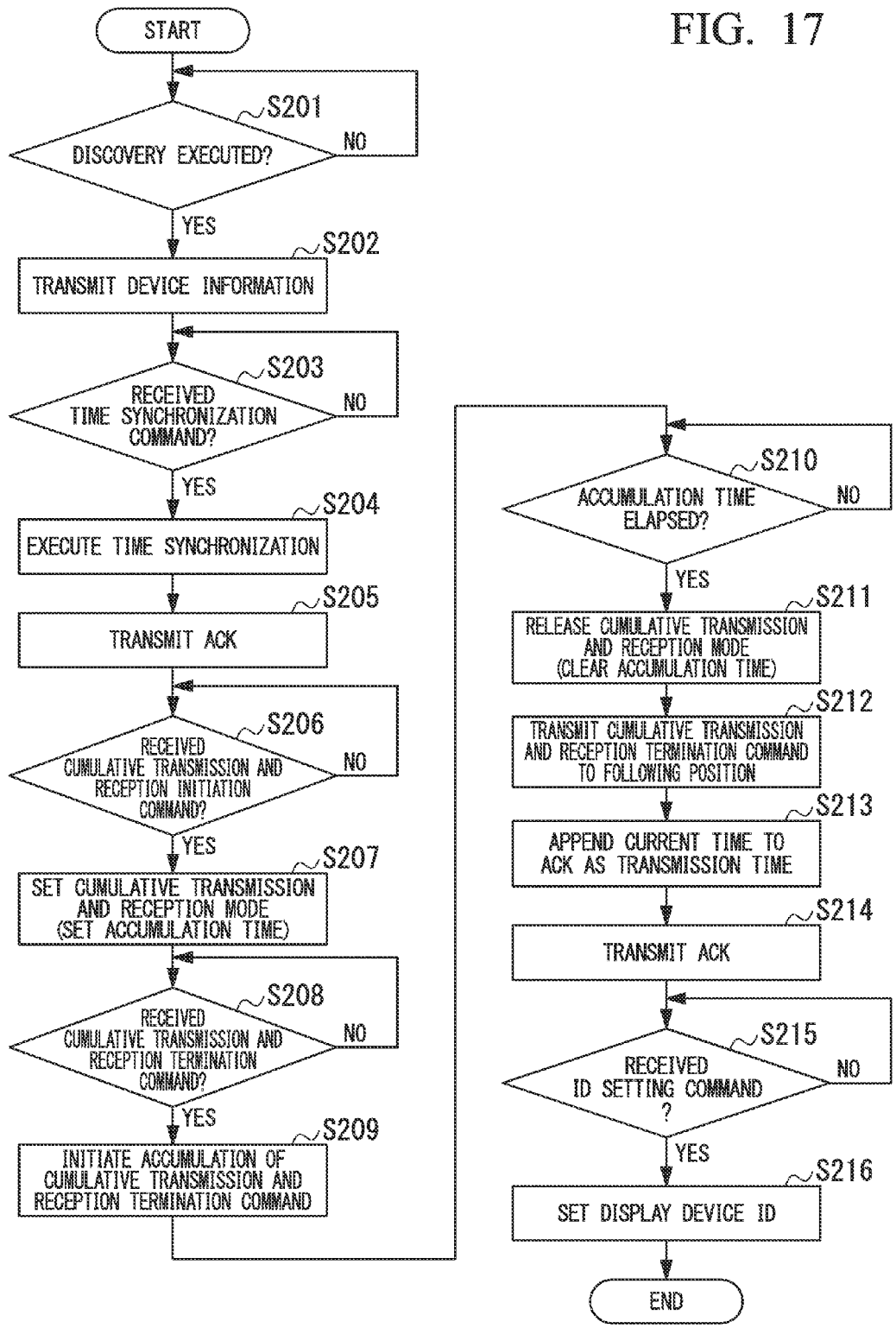
FIG. 17 is a diagram showing a processing sequence example executed by the slave display device according to the first exemplary embodiment.

The flowchart in FIG. 17 represents a processing sequence example executed by the slave display device 101-S according to the first exemplary embodiment.

Firstly, in the slave display device 101-S, the data transmission and reception unit 121 waits for discovery to be executed by the master display device 101-M (step S201—NO). Further, the data transmission and reception unit 121, in response to discovery being executed (step S201—YES), transmits device information to the master display device 101-M (step S202).

Next, the time synchronization unit 123 waits for the time synchronization command transmitted from the master display device 101-M to be received at the data transmission and reception unit 121 (step S203—NO). Further, in response to the time synchronization command being received (step S203—YES), the time synchronization unit 123 executes time synchronization (step S204).

In response to time synchronization being completed as a result of step S204, the time synchronization unit 123 transmits an ACK to the master display device 101-M from the data transmission and reception unit 121 for example (step S205).

Then, the data transmission and reception unit 121 waits for the cumulative transmission and reception initiation command transmitted from the master display device 101-M to be received (step S206—NO). In response to the reception of the cumulative transmission and reception initiation command (step S206—YES), the data transmission and reception unit 121 sets the cumulative transmission and reception mode (step S207). For example, the data transmission and reception unit 121 is able to set the cumulative transmission and reception mode by changing the accumulation time set to "0" to 10 msec for example.

In a state where the cumulative transmission and reception mode is set as a result of step S207, the data transmission and reception unit 121 waits for the cumulative transmission and reception termination command transmitted from the master display device 101-M to be received (step S208—NO).

In response to the reception of the cumulative transmission and reception termination command (step S208—YES), the data transmission and reception unit 121 initiates accumulation of the received cumulative transmission and reception termination command (step S209), and waits for the accumulation time of, for example, 10 msec, to elapse (step S210—NO).

Further, in response to the elapsing of the accumulation time (step S210—YES), the data transmission and reception unit 121 releases the cumulative transmission and reception mode set as a result of the prior step S207 (step S211), and switches to the non-cumulative transmission and reception mode for example. The data transmission and reception unit 121 is able to release the cumulative transmission and reception mode and switch to the non-cumulative transmission and reception mode by clearing the accumulation time to "0" for example.

Moreover, the data transmission and reception unit 121 transmits with respect to the following position in the daisy chain, the cumulative transmission and reception termination command accumulated to this point in an internal buffer (step S212).

Furthermore, the data transmission and reception unit 121 appends the current time that is timed by the clock unit 124, to the cumulative transmission and reception termination ACK as the transmission time (step S213). Then, the cumulative transmission and reception termination ACK, to which the transmission time has been appended, is transmitted to the master display device 101-M (step S214).

Next, the identifier setting unit 122 waits for an ID setting command with its own address transmitted from the master display device 101-M to be received at the data transmission and reception unit 121 (step S215—NO).

Further, when the ID setting command is received (step S215—YES), the identifier setting unit 122 sets the display device ID of the number specified by the received ID setting command (step S216). Specifically, the identifier setting unit 122 retains the display device ID setting information that represents the specified number for example.

Second Exemplary Embodiment

[Summary]

Next, a second exemplary embodiment is described. The configuration of the multi-screen display system 100 in the second exemplary embodiment may be the same as FIG. 1 and FIG. 2.

In the first exemplary embodiment, the distance recognition unit 115 recognizes, based on the transmission times appended to the cumulative transmission and reception termination ACKs, the network distances for each of the slave display devices 101-S with respect to the master display device 101-M.

In contrast, in the second exemplary embodiment, the network distances for each of the slave display devices 101-S with respect to the master display device 101-M are recognized in a manner described below based on the order in which the cumulative transmission and reception termination ACKs are received at the master display device 101-M.

As a result, in the second exemplary embodiment, it is not necessary to always execute time synchronization of the master display device 101-M and the slave display devices 101-S as described in FIG. 11 and FIG. 12 for example. Therefore, in the second exemplary embodiment, as long as the discovery as described in FIG. 10 is executed, and a list of slave display devices 101-S is created, the master display device 101-M, without performing time synchronization for example, may execute the transmission of the cumulative transmission and reception initiation command shown in FIG. 13 and FIG. 14, and the subsequent transmission of the cumulative transmission and reception termination command.

The time synchronization of the slave display devices 101-S itself is necessary for the synchronization of the playback time, and the like, when displaying an image for example. However, in the second exemplary embodiment, it is not necessary to execute time synchronization when setting the display device identifiers, and it can be executed with a different timing.

The respective slave display devices 101-S according to the second exemplary embodiment may execute the setting of the cumulative transmission and reception mode in response to the reception of a cumulative transmission and reception initiation command in the same manner as in the first exemplary embodiment.

Furthermore, the operations representing cumulative transmission and reception that are executed by each of the slave display devices 101-S in response to the reception of the cumulative transmission and reception termination command may also be made the same as in the first exemplary embodiment. Therefore, the transmission timing of the cumulative transmission and reception termination ACKs, in the same manner as in the first exemplary embodiment, are shifted in the order of the first slave display device 101-S1 to the eighth slave display device 101-S8 such that they are each delayed by the accumulation time (10 msec for example).

However, in the second exemplary embodiment, it is not necessary to append the transmission time to the cumulative transmission and reception termination ACK.

Here, as described above, the transmission timing of the cumulative transmission and reception termination ACKs are shifted in the order of the first slave display device 101-S1 to the eighth slave display device 101-S8 such that they are each delayed by the accumulation time (10 msec for example). Further, the ACKs transmitted in such an order pass through the network of the daisy chain, and are received in the same order.

The distance recognition unit 115 of the master display device 101-M according to the second exemplary embodiment stores the order in which the cumulative transmission and reception termination ACKs, which are successively transmitted from each of the first slave display device 101-S1 to the eighth slave display device 101-S8, are received in the storage unit 116 such that it is associated with the addresses (the IP addresses, the MAC addresses, or the like) of the slave display devices 101-S, which represent the sources of the cumulative transmission and reception termination ACKs thereof.

When the order is caused to be recorded in the distance recognition unit 115, the numbers assigned according to the order in which the cumulative transmission and reception termination ACKs are received, may be stored such that they are associated with the addresses. Alternatively, when the distance recognition unit 115 records the order, with the reception times at which the cumulative transmission and reception termination ACKs are received being treated as the order, the reception times may be associated with the addresses and stored. Hereafter, a case is described in which the times at which the cumulative transmission and reception termination ACKs are received, are stored in the storage unit 116 as the order.

Further, when the reception of the cumulative transmission and reception termination ACKs from all of the slave display devices 101-S is completed, the distance recognition unit 115 compares the reception times of the cumulative transmission and reception termination ACKs that are stored in the storage unit 116. The later this reception time becomes, the later the time at which the slave display device 101-S transmitted the ACK in response to the cumulative transmission and reception termination command also becomes. Therefore, the distance recognition unit 115 recognizes that, as the reception time becomes progressively later, the network distance of the slave display device 101-S also becomes separated.

Similarly in this case, the distance recognition unit 115 may recognize, in the same manner as in the first exemplary embodiment, that the network distance becomes an order of "1" to "8" in the order of the first slave display device 101-S1 to the eighth slave display device 101-S8 for example.

The identifier control unit 117 determines, in the same manner as in the first exemplary embodiment, display device IDs for each of the slave display devices 101-S according to the network distances recognized by the distance recognition unit 115. Furthermore, the identifier control unit 117 executes, as described in FIG. 15, a control for setting the determined display device IDs to each of the slave display devices 101-S.

[Processing Sequence Example]

Figure 18:
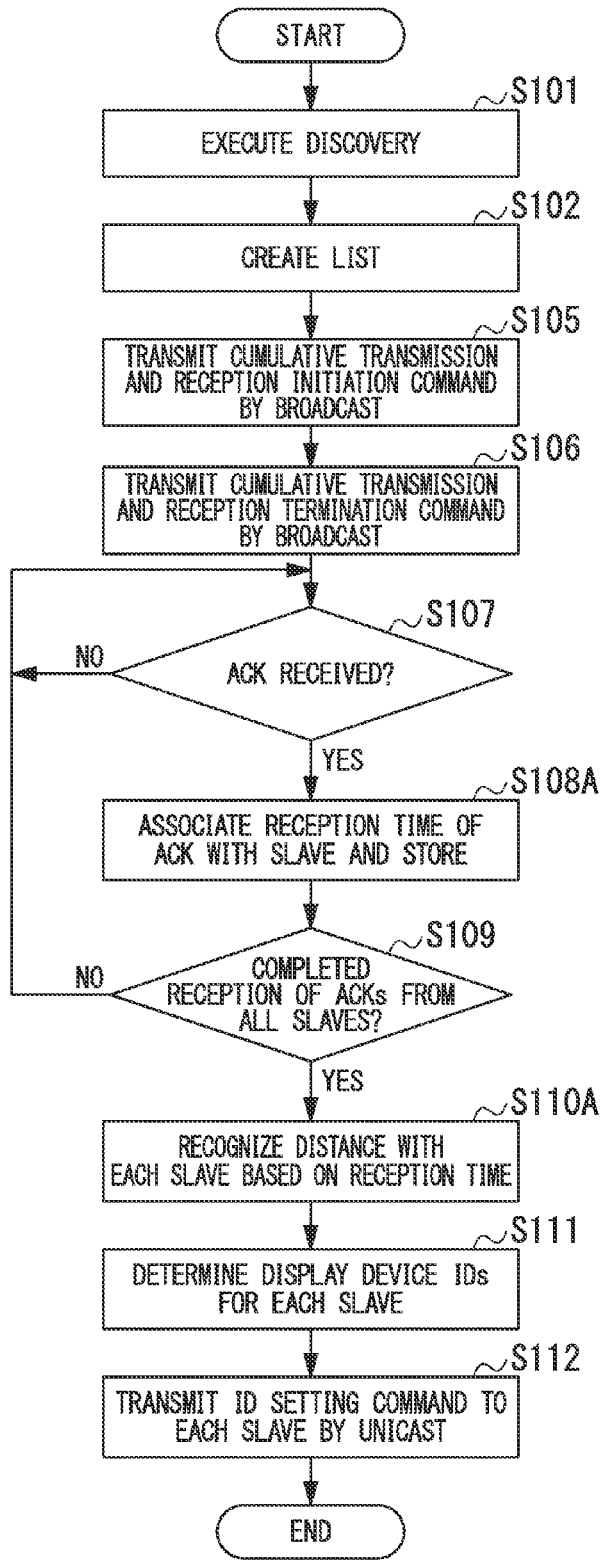
FIG. 18 is a diagram showing a processing sequence example executed by a master display device according to a second exemplary embodiment.

The flowchart in FIG. 18 represents a processing sequence example executed by the master display device 101-M according to the second exemplary embodiment.

In FIG. 18, steps representing the same processing as FIG. 16 are given the same reference symbol, and the descriptions are omitted. Here, the points of difference with FIG. 16 are mainly described.

In the processing of FIG. 18, the processing of steps S101, S102, S105, S106, S107, S109, S111, and S112 are the same as FIG. 16.

In addition, in the processing of FIG. 18, steps S103 and S104 in FIG. 16 are omitted. In this manner, in the second exemplary embodiment, it is not necessary to synchronize the times of the slave display devices 101-S with the master display device 101-M at the time of setting the display device IDs.

Furthermore, in FIG. 18, in response to a cumulative transmission and reception termination ACK being received (step S107—YES), the distance recognition unit 115 associates the reception time (that is to say, the order) in which this cumulative transmission and reception termination ACK is received with the address of the slave display device 101-S representing the transmission source of the ACK, and stores it in the storage unit 116 (step S108A).

Further, in response to the reception of cumulative transmission and reception termination ACKs transmitted from all of the slave display devices 101-S being completed (step S109—YES), the distance recognition unit 115 executes the following processing. That is to say, the distance recognition unit 115 recognizes, based on the reception times of the cumulative transmission and reception termination ACKs for each of the slave display devices 101-S that are stored in the storage unit 116, the network distance of each of the slave display devices 101-S with respect to the master display device 101-M (step S110A). The identifier control unit 117, following step S110A, sets display device IDs to each of the slave display devices 101-S by executing the processing of steps S111 and S112 in the same manner as FIG. 16.

Figure 19:
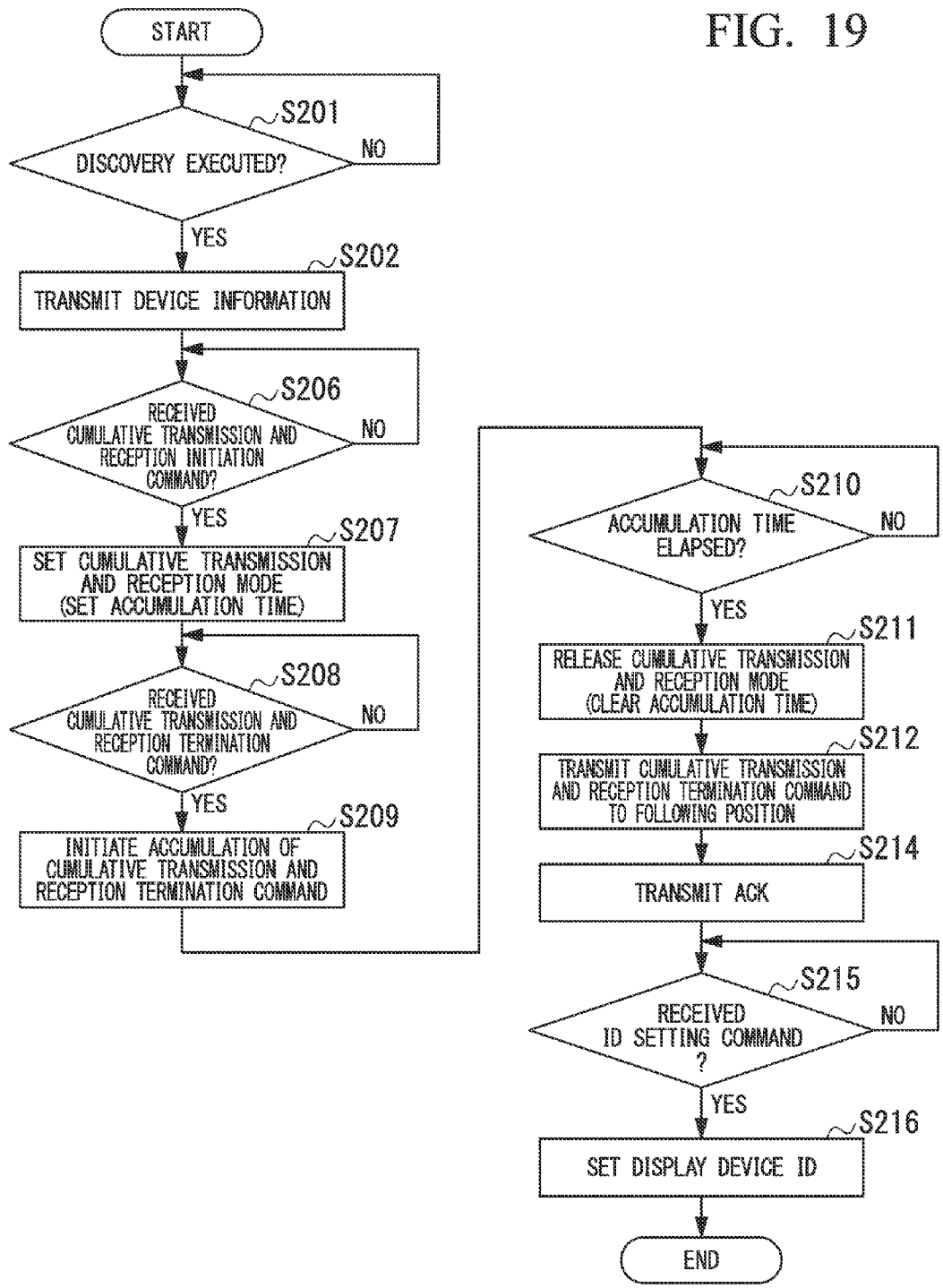
FIG. 19 is a diagram showing a processing sequence example executed by a slave display device according to the second exemplary embodiment.

The flowchart in FIG. 19 represents a processing sequence example executed by the slave display device 101-S according to the second exemplary embodiment.

In FIG. 19, steps representing the same processing as FIG. 17 are given the same reference symbol, and the descriptions are omitted. Here, the points of difference with FIG. 17 are mainly described.

The processing of steps S201, S202, S206 to S212, and S214 to S216 in FIG. 19 are the same as FIG. 17.

In addition, in the processing of FIG. 19, steps S203 to S205 in FIG. 17 are omitted.

That is to say, in the processing of the master display device 101-M in FIG. 18, a time synchronization command is not transmitted. Consequently, in the processing of FIG. 19, steps S203 to S205, which represent the processing of the reception of the time synchronization command and time synchronization in response to this, are omitted.

Further, in the processing of FIG. 19, the processing of step S213 is omitted. That is to say, in the second exemplary embodiment, the transmission time is not appended when the cumulative transmission and reception termination ACK is transmitted.

In this manner, in the second exemplary embodiment, the network distance of each of the slave display devices 101-S is recognized based on the order in which the cumulative transmission and reception termination ACKs are received at the master display device 101-M. That is to say, in the second exemplary embodiment, the network distance of each of the slave display devices 101-S is recognized based not on absolute time information, namely the transmission times of the cumulative transmission and reception termination ACKs, but rather based on relative time differences, namely the order in which the cumulative transmission and reception termination ACKs are received.

Consequently, in the second exemplary embodiment, it becomes unnecessary for the time in the slave display devices 101-S to be synchronized with that in the master display device 101-M in advance of the transmission of the cumulative transmission and reception initiation command and the cumulative transmission and reception termination command. Therefore, the sequence for time synchronization can be omitted. Furthermore, processing for appending the transmission times when the slave display devices 101-S transmit the cumulative transmission and reception termination ACKs can be omitted. In this manner, in the second exemplary embodiment, the processing that sets the display device IDs to the slave display devices 101-S can be simplified.

<Minimal Configuration for Present Invention>

Figure 20:
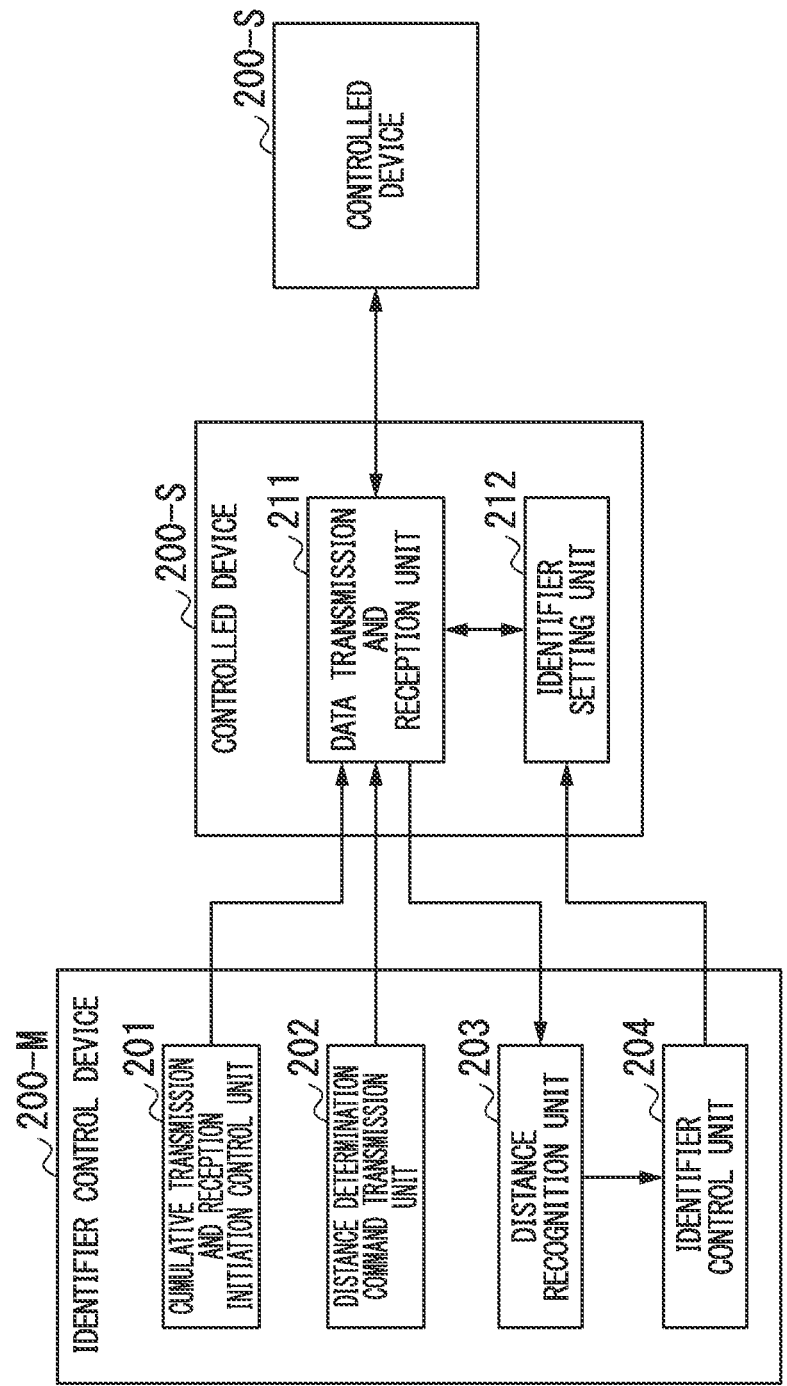
FIG. 20 is a diagram showing a minimal configuration of an identifier control system according to the present invention.

FIG. 20 represents a minimal configuration of an identifier control system according to the present invention. The identifier control system of FIG. 20 includes a single identifier control device 200-M and a plurality of controlled devices 200-S. In the identifier control system, a network is formed by daisy chaining where the identifier control device 200-M in a first position, and the plurality of controlled devices 200-S in a second position onwards, are connected in series.

The identifier control device 200-M includes a cumulative transmission and reception initiation control unit 201, a distance determination command transmission unit 202, a distance recognition unit 203, and an identifier control unit 204.

The cumulative transmission and reception initiation control unit 201 instructs via the network formed by daisy chaining, the initiation of cumulative transmission and reception to the plurality of controlled devices 200-S.

The distance determination command transmission unit 202, following instruction of the initiation of cumulative transmission and reception by the cumulative transmission and reception initiation control unit 201, executes the following processing. That is to say, the distance determination command transmission unit 202 transmits to each of the plurality of controlled devices 200-S via the network, the distance determination command, which is for determining a network distance with respect to each of the plurality of controlled devices 200-S.

The distance recognition unit 203 determines the network distance with respect to each of the plurality of controlled devices 200-S, based on the response signals transmitted by each of the plurality of controlled devices 200-S with respect to the distance determination command.

The identifier control unit 204 determines identifiers for each of the plurality of controlled devices 200-S based on the network distances with respect to each of the plurality of controlled devices 200-S recognized by the distance recognition unit 203. The identifier control unit 204 sets, via the network, the determined identifiers to each of the plurality of controlled devices 200-S.

Furthermore, the controlled device 200-S includes a data transmission and reception unit 211 and an identifier setting unit 212.

The data transmission and reception unit 211, after the initiation of cumulative transmission and reception is instructed by the cumulative transmission and reception initiation control unit 201, executes the following processing in a case where the aforementioned distance determination command is received as received data. That is to say, after the accumulation time elapses from the reception of the distance determination command, the data transmission and reception unit 211 transmits to the identifier control device via the network, a response signal with respect to the distance determination command. Furthermore, in addition to this, the data transmission and reception unit 211 transmits via the network, the received distance determination command to the controlled device in the following position.

The identifier setting unit 212 sets the identifier in compliance with a control by the identifier control unit 204.

The identifier control system with the configuration shown in FIG. 20 is able to automatically set, in a case where a plurality of devices are connected by a network formed by daisy chaining, identifiers for each device according to the connection sequence of the daisy chain in the same manner as the identifier control systems of the first exemplary embodiment and the second exemplary embodiment.

Examples of devices that embody the identifier control device 200-M and the controlled devices 200-S are in no way limited to the display devices described in the exemplary embodiments. For example, they include audio equipment, information devices, and the like, and are diverse.

Furthermore, execution management may be performed by recording a program that achieves the functions of each of the functional units shown in FIG. 2, FIG. 20 or the like to a recording medium that is computer-readable, reading the program recorded to the recording medium into a computer system, and then executing it. The "computer system" referred to here includes an OS and hardware such as peripheral devices.

Moreover, if the "computer system" utilizes a WWW system, it includes a home page-providing environment (or a displaying environment).

The "computer-readable recording medium" refers to a portable medium, such as a flexible disk, a magnetic optical disk, a ROM, or a CD-ROM, or a storage device built-in to the computer system, such as a hard disk. Further, the "computer-readable recording medium" includes those that retain the program for a fixed time, such as a volatile memory (RAM) in the interior of a computer system that becomes a client or a server when the program is transmitted via a network, such as the Internet, or a communication line, such as a telephone line. Moreover, the program may be one that achieves a portion of the functionality described above. Further, it may achieve the functionality described above in a combination with a program that is already stored in the computer system.

The foregoing has described in detail the exemplary embodiments of the invention with reference to the drawings. However, specific configurations are in no way limited to the exemplary embodiments, and include designs, and the like, within a scope that does not depart from the scope of the invention.

REFERENCE SYMBOLS

100 Multi-screen display system
101-M Master display device
101-S (101-S1 to 101-S8) Slave display devices
111 Communication unit
112 Search unit
113 Cumulative transmission and reception initiation control unit
114 Distance determination command transmission unit
115 Distance recognition unit
116 Storage unit
117 Identifier control unit
118 Time synchronization control unit
119 Clock unit
121 Data transmission and reception unit
122 identifier setting unit
123 Time synchronization unit
124 Clock unit

The invention claimed is:

1. An identifier control device comprising:
  a cumulative transmission and reception initiation control unit, as implemented by a processor in the identifier control device, that instructs a plural of controlled devices, via a network formed by connecting the plurality of controlled device by daisy chaining, to initiate cumulative transmission and reception being a process in which, after the plurality of controlled devices accumulate received data over a predetermined accumulation time, the plurality of controlled devices transmit data in response to the received data;
  a distance determination command transmission unit, as implemented by the processor, that transmits to each of the plurality of controlled devices via the network a distance determination command for determining distances on the network with respect to the respective plurality of controlled devices, after initiation of the cumulative transmission and reception is instructed by the cumulative transmission and reception initiation control unit;
  a distance recognition unit, as implemented by the processor, that determines the distances on the network with respect to the respective plurality of controlled devices, based on an order relationship between command processing times at which a predetermined command processing is executed by the respective plurality of controlled devices in response to the distance determination command, wherein the command processing times are based on response signals being transmitted by the respective plurality of controlled devices after the accumulation time has elapsed from when each of the plurality of controlled devices receives the distance determination command; and
  an identifier control unit that sets to each of the plurality of controlled devices, via the network, an identifier for each of the plurality of controlled devices determined based on the determined distances on the network with respect to the respective plurality of controlled devices.

2. The identifier control device according to claim 1, wherein the distance recognition unit recognizes the order relationship between the command processing times for the respective plurality of controlled devices, based on the command processing times which are appended to the response signals by the respective plurality of controlled devices.

3. The identifier control device according to claim 1, wherein the identifier control unit determines identifier numbers according to ascending order or descending order for the respective plurality of controlled devices in order from a closest distance on the network for each of the plurality of controlled devices recognized by the distance recognition unit.

4. The identifier control device according to claim 1, wherein the distance determination command transmission unit transmits as the distance determination command, a cumulative transmission and reception termination command indicating termination of the cumulative transmission and reception for each of the plurality of controlled devices.

5. The identifier control device according to claim, 1, wherein the distance recognition unit recognizes the order relationship between the command processing times for the respective plurality of controlled devices, based on order in which response signals transmitted by the respective plurality of controlled devices are received.

6. The identifier control device according to claim 1, wherein one of the plurality of controlled devices transmits the distance determination command to a controlled device in a next position after the accumulation time elapses from when the one of the plurality of controlled devices receives the distance determination command.

7. The identifier control device according to claim 1, wherein the distances on the network with respect to the respective plurality of controlled devices correspond to a number of communication paths between controlled devices that are passed through before reaching the respective plurality of controlled devices with the identifier control device as an origin.

8. An identifier control system comprising:
an identifier control device arranged in a first position; and
a plurality of controlled devices arranged in a second position onwards, the identifier control device and the plurality of controlled devices being connected to each other by a network formed by daisy chaining,
wherein the identifier control device includes:
a cumulative transmission and reception initiation control unit, as implemented by a processor in the identifier control device, that instructs the plurality of controlled devices, via the network, to initiate cumulative transmission and reception being a process in which, after the plurality of controlled devices temporarily accumulate received data over a predetermined accumulation time, the plurality of controlled devices transmit data in response to the received data;
a distance determination command transmission unit, as implemented by the processor, that transmits to each of the plurality of controlled devices via the network a distance determination command for determining distances on the network with respect to the respective plurality of controlled devices, after initiation of the cumulative transmission and reception is instructed by the cumulative transmission and reception initiation control unit;
a distance recognition unit, as implemented by the processor, that determines the distances on the network with respect to the respective plurality of controlled devices, based on response signals with respect to the distance determination command, the response signals being transmitted by the respective plurality of controlled devices after the accumulation time has elapsed from when each of the plurality of controlled devices receives the distance determination command; and
an identifier control unit, as implemented by the processor, that sets to each of the plurality of controlled devices, via the network, an identifier for each of the plurality of controlled devices determined based on the determined distances on the network with respect to the respective plurality of controlled devices, and
wherein at least one controlled device of the plurality of controlled devices includes:
a data transmission and reception unit, as implemented by a processor in the at least one controlled device, that receives the distance determination command after being instructed to initiate the cumulative transmission and reception by the cumulative transmission and reception initiation control unit, the data transmission and reception unit, after the accumulation time has elapsed from reception of the distance determination command, transmitting to the identifier control device via the network a response signal with respect to the distance determination command and transmitting the received distance determination command via the network to a controlled device in a following position, and
an identifier setting unit, as implemented by the processor, that sets an identifier in compliance with a control by the identifier control unit.

9. A multi-screen display system, comprising:
a master display device arranged in a first position; and
a plurality of slave display devices arranged in a second position onwards,
the master display device and the plurality of slave display devices being connected to each other by a network formed by daisy chaining, a screen of the master display device and screens of the plurality of slave display devices being arranged in a predetermined arrangement pattern,
wherein the master display device includes:
a cumulative transmission and reception initiation control unit, as implemented by a first processor in the master display device, that instructs the plurality of slave display devices, via the network, to initiate cumulative transmission and reception being a process in which, after the plurality of slave display devices temporarily accumulate received data over a predetermined accumulation time, the plurality of controlled devices transmit data in response to the received data;
a distance determination command transmission unit, as implemented by the first processor, that transmits to each of the plurality of slave display devices via the network a distance determination command for determining distances on the network with respect to the respective plurality of slave display devices, after initiation of the cumulative transmission and reception is instructed by the cumulative transmission and reception initiation control unit;
a distance recognition unit, as implemented by the first processor, that determines the distances on the network with respect to the respective plurality of slave display devices, based on response signals with respect to the distance determination command, the response signals being transmitted by the respective plurality of slave display devices after the accumulation time has elapsed from when each of the plurality of slave display devices receives the distance determination command; and
an identifier control unit, as implemented by the first processor, that sets to each of the plurality of slave display devices, via the network, an identifier for each of the plurality of slave display devices determined based on the determined distances on the network with respect to the respective plurality of slave display devices, and
wherein at least one slave display device of the plurality of slave display devices includes:
a data transmission and reception unit, as implemented by a second processor in the at least one slave display device, that receives the distance determination command after being instructed to initiate the cumulative transmission and reception by the cumulative transmission and reception initiation control unit, the data transmission and reception unit, after the accumulation time has elapsed from reception of the distance determination command, transmitting to the master display device via the network a response signal with respect to the distance determination command and transmitting the received distance determination command via the network to a slave display device in a following position; and an identifier setting unit as implemented by the second processor, that sets an identifier in compliance with a control by the identifier control unit.

10. An identifier control method comprising:

instructing a plurality of controlled devices, via a network formed by connecting the plurality of controlled devices by daisy chaining, to initiate cumulative transmission and reception being a process in which, after the plurality of controlled devices temporarily accumulate received data over a predetermined accumulation time, the plurality of controlled devices transmit data in response to the received data;

transmitting to each of the plurality of controlled devices via the network a distance determination command for determining distances on the network with respect to the respective plurality of controlled devices, after the plurality of controlled devices are instructed to initiate the cumulative transmission and reception;

determining the distances on the network with respect to the respective plurality of controlled devices, based on an order relationship between command processing times at which a predetermined command processing is executed by the respective plurality of controlled devices in response to the distance determination command, wherein the command processing times are based on response signals being transmitted by the respective plurality of controlled devices after the accumulation time has elapsed from when each of the plurality of controlled devices receives the distance determination command; and setting to each of the plurality of controlled devices, via the network, an identifier for each of the plurality of controlled devices determined based on the determined distances on the network with respect to the respective plurality of controlled devices.

11. A non-transitory computer-readable recording medium storing a program that causes a processor in a master display device to execute:

instructing a plurality of controlled devices, via a network formed by connecting the plurality of controlled devices by daisy chaining, to initiate cumulative transmission and reception in which being a process, after the plurality of controlled devices temporarily accumulate received data over a predetermined accumulation time, the plurality of controlled devices transmit data in response to the received data;

transmitting to each of the plurality of controlled devices via the network a distance determination command for determining distances on the network with respect to the respective plurality of controlled devices, after the plurality of controlled device are instructed to initiate the cumulative transmission and reception;

determining the distances on the network with respect to the respective plurality of controlled devices, based on an order relationship between command processing times at which a predetermined command processing is executed by the respective plurality of controlled devices in response to the distance determination command, wherein the command processing times are based on response signals being transmitted by the respective plurality of controlled devices after the accumulation time has elapsed from when each of the plurality of controlled devices receives the distance determination command; and setting to each of the plurality of controlled devices, via the network, an identifier for each of the plurality of controlled devices determined based on the determined distances on the network with respect to the respective plurality of controlled devices.

\* \* \* \* \*